US012723916B2

(12) United States Patent
Zemtsop et al.

(10) Patent No.: US 12,723,916 B2
(45) Date of Patent: Sep. 1, 2026

(54) SYSTEM AND METHOD FOR ADJUSTING OPTICAL DATA TO ACCOUNT FOR VARIATIONS INTRODUCED IN AN OPTICAL SYSTEM

(71) Applicant: Metrohm Spectro, Inc., Plainsboro, NJ (US)

(72) Inventors: Celestin Zemtsop, Laramie, WY (US); Wei Yu, Laramie, WY (US); Keith Carron, Centennial, WY (US); Quaid Vohra, Laramie, WY (US)

(73) Assignee: Metrohm Spectro, Inc., Plainsboro, NJ (US)

( * ) Notice: Subject to any disclaimer, the term of this patent is extended or adjusted under 35 U.S.C. 154(b) by 53 days.

(21) Appl. No.: 18/691,322

(22) PCT Filed: Sep. 13, 2022

(86) PCT No.: PCT/US2022/043368

§ 371 (c)(1),
(2) Date: Mar. 12, 2024

(87) PCT Pub. No.: WO2023/039291

PCT Pub. Date: Mar. 16, 2023

(65) Prior Publication Data

US 2024/0402009 A1 Dec. 5, 2024

Related U.S. Application Data

(60) Provisional application No. 63/243,683, filed on Sep. 13, 2021.

(51) Int. Cl.

| | |
|---|---|
| ***G01J 3/44*** | (2006.01) |
| ***G01J 3/02*** | (2006.01) |
| ***G01N 21/65*** | (2006.01) |

(52) U.S. Cl.

CPC ............ *G01J 3/027* (2013.01); *G01J 3/0272* (2013.01); *G01J 3/44* (2013.01); *G01N 21/65* (2013.01); *G01J 2003/4424* (2013.01)

(58) Field of Classification Search

CPC ........ G01J 3/02; G01J 3/44; G01J 3/64; G01J 3/18; G01J 3/28; G01J 3/06; G01N 21/65; G01N 21/274

See application file for complete search history.

(56) References Cited

U.S. PATENT DOCUMENTS

| | | | | |
|---|---|---|---|---|
| 2001/0017195 A1* | 8/2001 | Trung | .................... | G01N 21/65 162/49 |
| 2006/0197947 A1* | 9/2006 | Wang | .................... | G01N 21/65 356/301 |

(Continued)

FOREIGN PATENT DOCUMENTS

| | | | | |
|---|---|---|---|---|
| EP | 3435072 A1 * | 1/2019 | ................ | G01J 3/10 |

*Primary Examiner* — Abdullahi Nur

(74) *Attorney, Agent, or Firm* — FisherBroyles, LLP; Thomas J. Osborne, Jr.

(57) ABSTRACT

Optical data captured in an optical system may be distorted or otherwise affected by various factors, such as but not limited to physical interference, fluorescence, noise or other factors. The effects on the optical data may interfere with any number of uses of the optical data, such as identification, presentation, or the like. Although various embodiments are provided, such as but not limited to spectroscopy, chromatography, and image processing, these are merely example embodiments, and the processing and/or removal of one or more components within the optical data to account for the distortions or other effects. Other applications may include any x, y or x, y, z dataset of optical data.

27 Claims, 36 Drawing Sheets

(56) References Cited

U.S. PATENT DOCUMENTS

| | | | | |
|---|---|---|---|---|
| 2013/0120741 | A1* | 5/2013 | Poteet | G01N 21/31 356/72 |
| 2016/0370228 | A1* | 12/2016 | Tok | G01J 3/433 |
| 2020/0355553 | A1* | 11/2020 | Kersey | G01N 21/6486 |

* cited by examiner

Still fluorescent at 1064 nm excitation.

Image with continuous background interference due to haze.

Image with continuous background interference due to haze with the haze removed

FIGURE 34

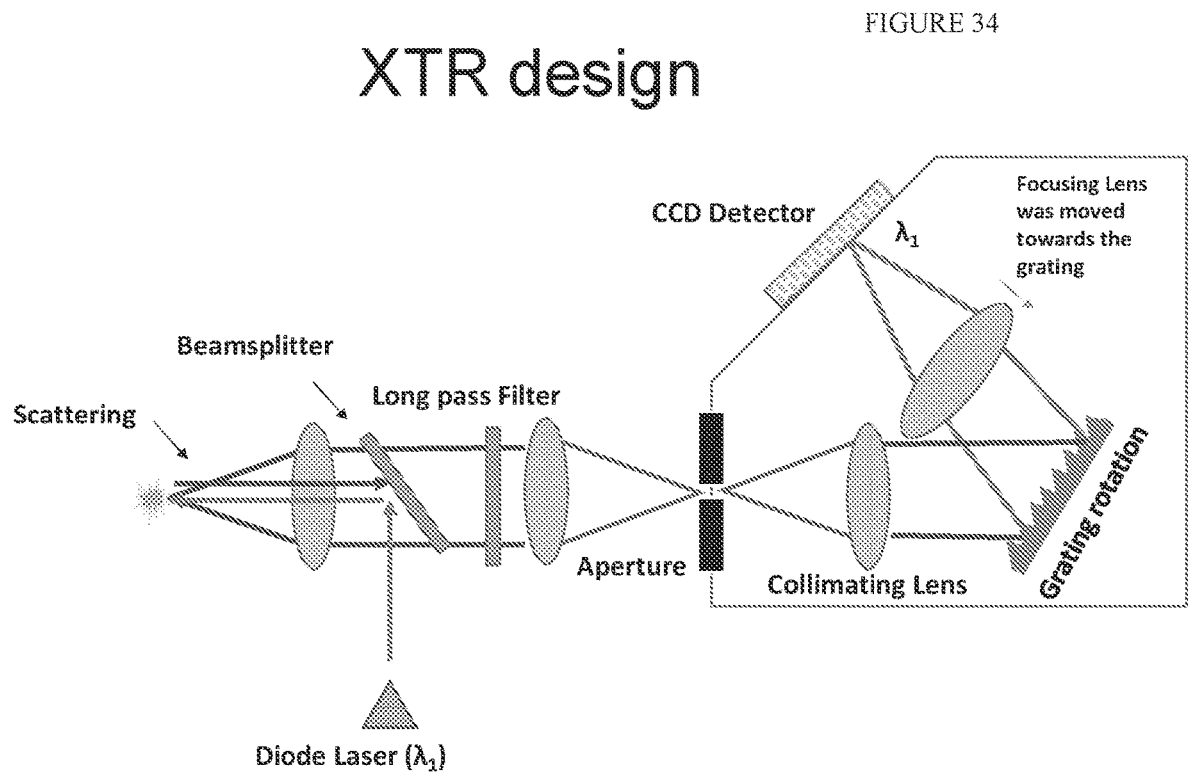

XTR design

CCD Detector
$\lambda_1$
Focusing Lens was moved towards the grating
Beamsplitter
Long pass Filter
Scattering
Aperture
Collimating Lens
Grating rotation
Diode Laser ($\lambda_1$)

SYSTEM AND METHOD FOR ADJUSTING OPTICAL DATA TO ACCOUNT FOR VARIATIONS INTRODUCED IN AN OPTICAL SYSTEM

CROSS-REFERENCE TO RELATED APPLICATIONS

This application claims the benefit of U.S. provisional application No. 63/243,683, filed 13 Sep. 2021, which is hereby incorporated by reference as though fully set forth herein.

BACKGROUND a. Field

The present disclosure relates to a system and method for adjusting optical data to account for one or more factors introduced in an optical system, such as but not limited to physical interference, fluorescence, noise or other factors.

b. Background

Raman scattering is the inelastic scattering of light from vibrational levels in a molecule. It is considered a weak phenomenon with approximately only 1 in 1,000,000 photons scattered through the Raman process. Due to the small amount of Raman scattering observed a laser of relatively high intensity is used to detect the Raman scattered photons.

One method to enhance the Raman signal is to match the laser wavelength with an optical absorption of the sample. For example, a green plant will absorb red light. If the plant material is place in a Raman spectrometer using a red laser the observed Raman scattering may be as much as 1000 times stronger. This phenomenon is called Resonance Raman scattering.

The practical problem with Resonance Raman scattering is that excitation with a laser wavelength which overlaps with an optical absorption will lead to a competing process called fluorescence. This is illustrated in FIG. 1. While Resonance Raman may bring the number of photons scattered to 1 in 1000, the fluorescence signal is usually in the range of 1:10 to as high as 1:1 of the amount of signal absorbed. There is no difference to the detector between a Raman scattered photon or a fluorescence photon and this means that the fluorescence signal is dominant. This is illustrated in FIG. 2. Since the noise in a spectrum scales as the square root of the signal, the large fluorescence can produce noise levels that approach the Raman scattered signal. In the example of FIG. 2, a detected spectrum includes fluorescence and relatively small features corresponding to Raman features in the signal. The Raman features can be difficult to identify due to the baseline fluorescent signal.

The interference of fluorescence has made Resonance Raman scattering impractical in most cases. There are spectroscopic tricks like adding a material with heavy atoms to promote spin orbit coupling, but these involve dilution of the sample and, in general, do not work well. Fluorescence can be distinguished by time: fluorescence occurs on the 10-nanosecond level, while Raman is considered instantaneous. This has led to instruments that use very short Raman pulses and gate the signal to reduce the amount of fluorescence induced photons that are produced.

The time approach is often called time-gated Raman spectroscopy. While this approach has been shown to reduce fluorescence, it requires very costly pulsed lasers and gated detection. It is not a practical solution for a small (handheld) inexpensive device. The cost and laser size with the associated electronics is impractical.

An approach to reduce fluorescence is to use a laser that does not overlap with an electronic state within the sample. This is illustrated in FIG. 3A. In this case fluorescence is not excited since the process of relaxing within an excited state cannot occur. While Raman becomes more apparent, this method cannot by definition produce the desired resonance Raman Effect. In FIG. 3A, the number of materials that absorb light decreases with wavelength. Few materials absorb or fluoresce above 1000 nm. The spectrum shown in FIG. 3A for a material that would fluoresce at 785 nm has visible Raman features with 1064 nm excitation.

BRIEF SUMMARY

Optical data captured in an optical system may be distorted or otherwise affected by various factors, such as but not limited to physical interference, fluorescence, noise or other factors. The effects on the optical data may interfere with any number of uses of the optical data, such as identification, presentation, or the like. Although various embodiments are provided, such as but not limited to spectroscopy, chromatography, and image processing, these are merely example embodiments, and the processing and/or removal of one or more components within the optical data to account for the distortions or other effects. Other applications may include any x, y or x, y, z dataset of optical data.

In one embodiment, a method of adjusting optical data is provided. The method comprises receiving optical data from a detector. The optical data comprises an optical signal and at least one baseline component in the optical data. The method also comprises generating a plurality of shifted optical data sets, separating data corresponding to the optical signal and the at least one component, and determining the at least one component of the optical data based on the separated optical signal. In one aspect, the operation of separating data may comprise separating the optical data corresponding to the optical signal from the optical data corresponding to at least one component. The separation, for example, may include superimposing data from the optical data obtained from the detector and the plurality of shifted optical data sets to create a vector, building a mathematical matrix operator, and solving to determine an optical signal and a vector corresponding to the at least one component.

In another embodiment, image processing device is provided. The image processing device comprises: an image detector; and a controller. The controller is adapted to receive optical data from a detector, generate a plurality of shifted optical data sets, separate data corresponding to the optical signal and the at least one component, and determine the at least one component of the optical data based on the separated optical signal. The optical data comprises an optical signal and at least one baseline component in the optical data.

In another embodiment, a spectrometer is provided. The spectrometer comprises a laser adapted to provide an excitation beam; an optical system adapted to provide the excitation beam to a sample and receive a Raman scattering signal from the sample; a detector adapted to receive the Raman scattering signal via the optical system; and a controller. The controller is adapted to read a first set of sample spectral data from the detector, the first set of sample spectral data comprising a single measured Raman spectrum component based on the Raman scattering signal and a baseline component, generate a plurality of sets of shifted spectral data corresponding to the first set of sample spectral data of the single measured Raman spectrum, separate data corresponding to the measured Raman spectrum and the baseline component from the first set of sample spectral data, and determine at least one component of the sample based on the separated measured single Raman spectrum.

In another embodiment, a method of determining a Raman spectroscopic signal is provided. In this embodiment, the method comprises: obtaining a single measured spectrum; generating a plurality of shifted, discrete spectra corresponding to the single measured spectrum; superimposing data from each of the plurality of discrete shifted spectroscopic signals to create a vector; building a mathematical matrix operator; and using the mathematical matrix operator to solve a linear problem.

The foregoing and other aspects, features, details, utilities, and advantages of the present invention will be apparent from reading the following description and claims, and from reviewing the accompanying drawings.

BRIEF DESCRIPTION OF THE DRAWINGS

FIG. 34 illustrates a moveable focusing lens disposed between the grating and the detector in an optical system of the spectrometer shown in FIG. 33.

DETAILED DESCRIPTION

Figure 1:
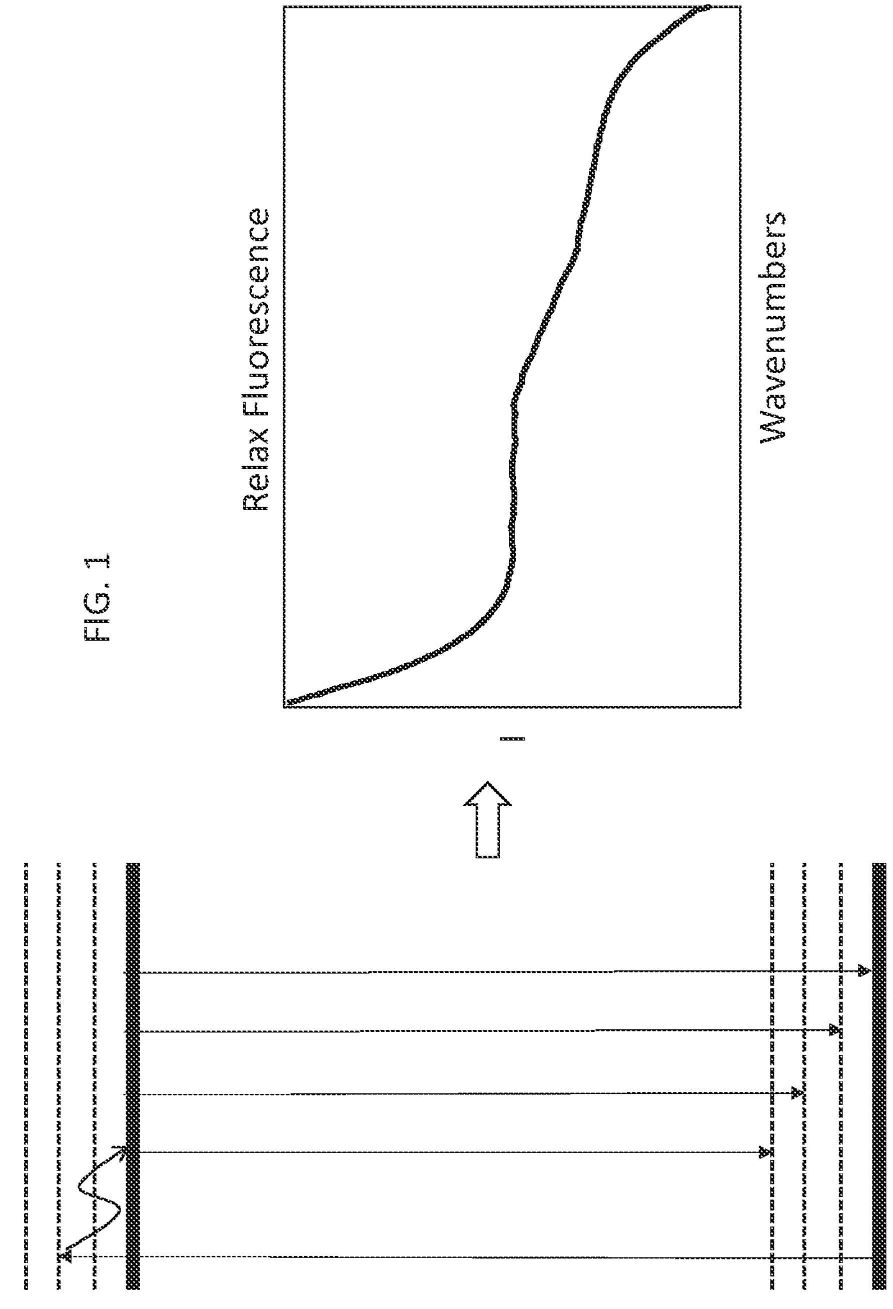
FIG. 1 illustrates a practical problem with Resonance Raman scattering in that excitation with a laser wavelength that overlaps with an optical absorption will lead to a competing process called fluorescence.
Figure 2:
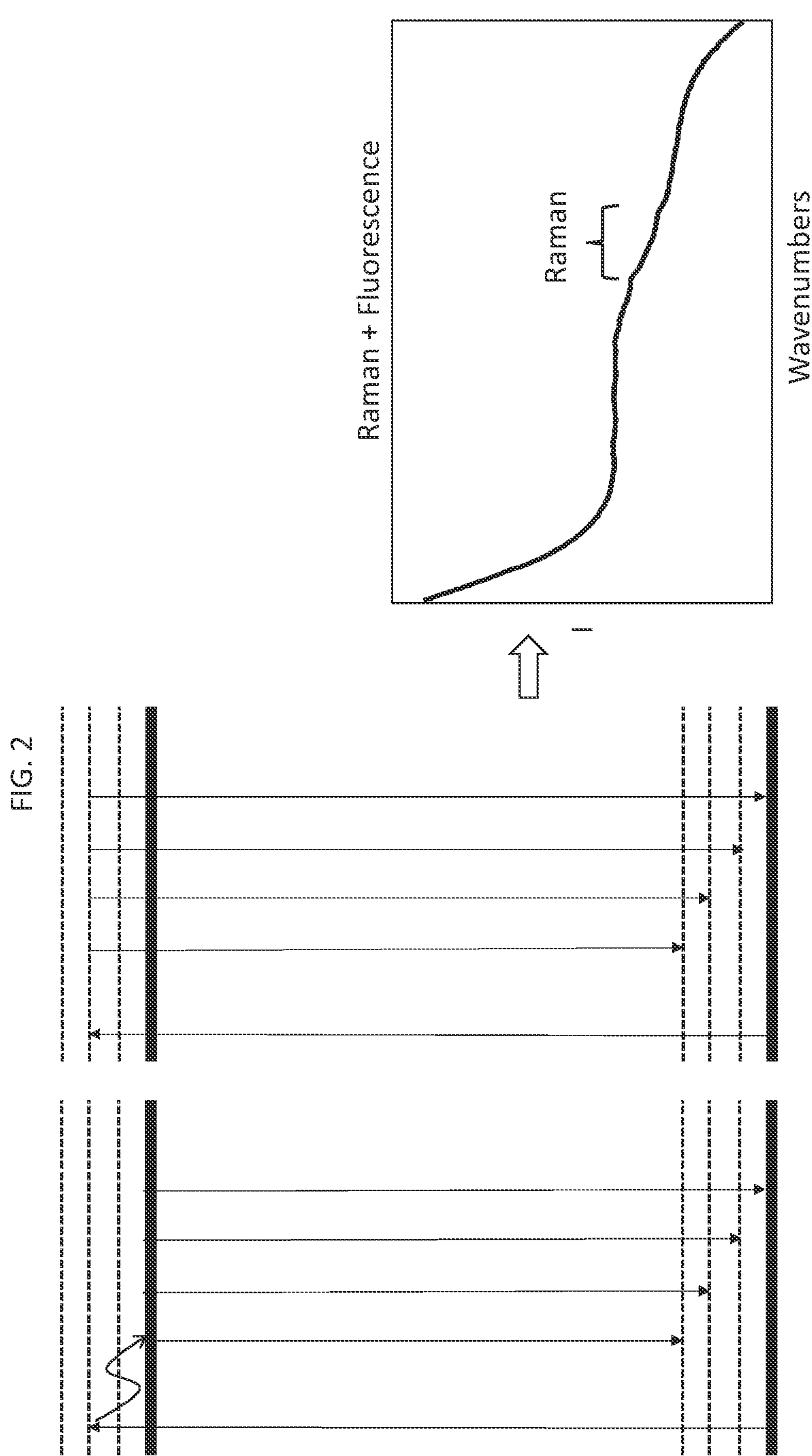
FIG. 2 illustrates an example of a Raman spectrum where the sample is fluorescent.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used throughout, the singular forms "a," "an" and "the" include plural referents unless the context clearly dictates otherwise. Thus, for example, reference to "a" component can include two or more such components unless the context indicates otherwise. Also, the words "proximal" and "distal" are used to describe items or portions of items that are situated closer to and away from, respectively, a user or operator such as a surgeon. Thus, for example, the tip or free end of a device may be referred to as the distal end, whereas the generally opposing end or handle may be referred to as the proximal end.

All directional references (e.g., upper, lower, upward, downward, left, right, leftward, rightward, top, bottom, above, below, vertical, horizontal, clockwise, and counter-clockwise) are only used for identification purposes to aid the reader's understanding of the present invention, and do not create limitations, particularly as to the position, orientation, or use of the invention. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

The term "substantially" as used herein may be applied to modify any quantitative representation which could permissibly vary without resulting in a change in the basic function to which it is related.

The term "baseline," "baseline component," or baseline factor" denotes a component or factor of a signal or data set that is at least substantially stable over at least a portion of the signal or data set. This stability allows the baseline component or factor to be compared to a portion of the signal or data set that is relatively unstable within at least that portion of the signal or data set. In a Raman spectroscopic signal, for example, noise, fluorescence, interference pattern, or the like is relatively stable within a range of wavenumbers compared to a Raman spectrum within the same spectroscopic signal.

Optical data captured in an optical system may be distorted or otherwise affected by various factors, such as but not limited to physical interference, fluorescence, noise or other factors. The effects on the optical data may interfere with any number of uses of the optical data, such as identification, presentation, or the like. Although various embodiments are provided, such as but not limited to spectroscopy, chromatography, and image processing, these are merely example embodiments, and the processing and/or removal of one or more components within the optical data to account for the distortions or other effects. Other applications may include any x, y or x, y, z dataset of optical data.

Spectroscopy

Figure 4:
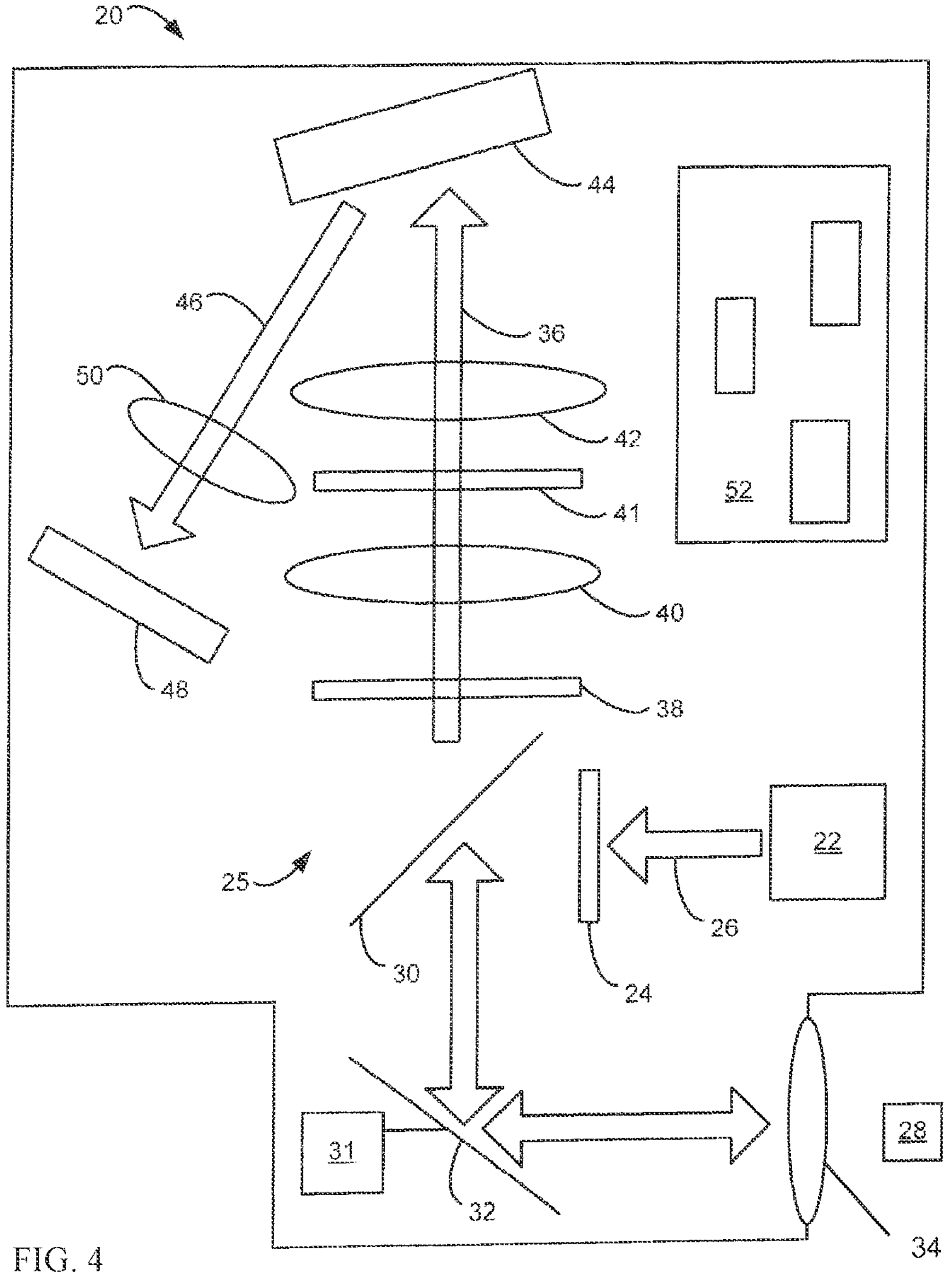
FIG. 4 illustrates an example embodiment of a spectrometer configured to illuminate a sample by directing an excitation signal (e.g., an excitation light signal), receive a spectroscopic signal in return from the sample and determine a spectrum from the spectroscopic signal corresponding to one or more component(s) of the complex sample.

FIG. 4 shows an example embodiment of a spectrometer 20 configured to illuminate a sample by directing an excitation signal (e.g., an excitation light signal), receive a spectroscopic signal in return from the sample and determine a spectrum from the spectroscopic signal corresponding to one or more component(s) of the complex sample. In the example implementation of FIG. 4, for example, the spectrometer may simply provide the excitation signal from a laser via an optical system, receive the spectroscopic signal, and provide the spectroscopy to a detector via the optical system.

Although the particular example shows a Raman spectrometer, other types of spectrometers, such as a luminescence spectrometer, could readily be designed based on the description herein. As shown in FIG. 4, the spectrometer 20 comprises an excitation source 22. The excitation source 22 typically comprises a laser light source. In one embodiment, for example, the excitation source 22 comprises a diode laser. A diode laser, for example, is capable of providing a plurality of wavelengths from the excitation source 22. The spectrometer 20 may further comprise a filter to filter the output of the excitation source 22, such as removing spurious emissions from the excitation source 22.

The spectrometer 20 further comprises an optical system 25. The optical system 25 directs the incident beam 26 toward a sample 28 and receives a spectroscopic signal from the sample 28. In the embodiment shown in FIG. 4, for example, the optical system 25 comprises a dichroic beam-splitter mirror 30. However, the incident beam 26 may be directed at sample 28 without any intervening instrument components located in the path of incident beam 26. The incident beam 26 also may be directed at a mirror, a holographic transmissive element, a mirror formed with a hole in the mirror or any other means for directing an incident beam known in the art.

The optical system 25 can further be adapted to move the incident beam across a surface of the sample 28. In one embodiment, for example, an actuator assembly 31 moves (e.g., vibrates) one or more element of the optical system 25 (e.g., a moveable mirror 32) to move a focused beam across a surface of the sample 28. The actuator assembly 31, for example, may control a moveable mirror to move a focused incident beam 26 across a surface of the sample 28. The actuator assembly 31, for example, may control the moveable mirror 32 to move the incident beam in any path or pattern across the surface of the sample 28. In one implementation, for example, the actuator assembly 31 may control the moveable mirror 32 in such a manner as to trace one or more line, circle, elliptical or other paths across the surface of the sample. U.S. Pat. No. 10,473,522 entitled "Spectrometer" and issued on Nov. 12, 2019 describes a number of examples of actuator assemblies that can be used and is incorporated herein in its entirety.

The incident beam 26 may further be directed through a lens 34. In one embodiment, the lens 34 comprises a focusing lens in the path of the incident beam 26. The focusing lens couples the incident beam 26 with the sample 28 and collects the spectroscopic signal (e.g., Raman scattered light) from the sample. In another embodiment, more than one lens 34 may be located in the path of the incident beam 26 before the incident beam 26 contacts the sample 28. In various embodiments, the spectrometer 20 may include other optical elements for directing an incident beam 26 toward a sample and collecting a spectroscopic signal from the sample. The optical system of the spectrometer 20, for example, may include elements such as a collimated beam tube or a fiber optic waveguide. See, e.g., U.S. Pat. No. 7,403,281 for examples of collimated beam tubes or fiber optic waveguides that may be used in optical systems of various spectrometers, which is incorporated by reference in its entirety for all that it teaches and suggests.

The incident beam 26 induces or generates on contact with the sample 28 a spectroscopic signal to be detected by the spectrometer 20. In Raman spectroscopy, for example, the incident beam 26 induces or generates on contact with the sample 28 scattered radiation having an energy differential different from, and one or more wavelengths different than, the incident radiation 26, or the Raman shift that, for convenience, is described in this document as a Raman beam. As stated above, and as shown in FIG. 4, in one embodiment the spectrometer 20 comprises a beam-splitter, such as a dichroic beam-splitter mirror 30. The spectroscopic signal 36 (e.g., Raman beam) is directed back through the lens 34 and the dichroic beam-splitter mirror 30 in a 180 degree back-scatter geometry. Neither the incident beam 26 nor the spectroscopic signal 36 need be co-linear. In the embodiment shown in FIG. 4, however, the spectroscopic signal 36 passes back through the dichroic beam-splitter mirror 30 and then through a filter element 38. In one embodiment, the filter element 38 comprises a long pass filter that removes extraneous radiation (e.g., from the light source 22 or another source) prior to dispersing the spectroscopic signal 36 into a spectrum. Alternatively, the filter element 38 may comprise a notch filter, or any other filter that is capable of rejecting elastically scattered radiation.

The spectroscopic signal 36 may further pass through an input focusing lens 40 that focuses the spectroscopic signal 36 to a point at a spatial filter 41. In one embodiment, for example, the spatial filter 41 comprises an aperture, slit or notch and is located at the focal point of the input focusing lens 40. The spatial filter 41 spatially filters the beam at the focal point of the input focusing lens.

The spectrometer 20 shown in FIG. 4 further comprises a collimating lens 42 that collimates the diverging spectroscopic signal 36 after it has passed through an aperture of the spatial filter 41 (e.g., an aperture, slit or notch). The collimating lens 42 further directs the re-collimated Raman beam toward a diffraction grating 44. The diffraction grating 44 comprises an optical element that divides a Raman beam into spatial separated wavelengths. The diffraction grating 44 further directs a divided Raman beam 46 toward a detector 48. The divided Raman beam 46 passes through a detector focusing lens 50 that focuses the spatially separated wavelengths of the divided Raman beam 46 onto the detector 48.

The detector 48 comprises a transducer that converts optical energy into an electrical signal. In one embodiment, for example, the detector 48 comprises an array of individual transducers that create an electrical pattern representing the spatially separated wavelengths of the Raman spectrum. A charge-coupled device (CCD) array, for example, may be used as the detector 48 in one embodiment of the invention. In another embodiment, an Indium-Gallium-Arsenide (InGaAs) detector 48. Other detectors known in the art may also be used within a spectrometer of the present invention.

The spectrometer 20 further comprises control electronics 52 for controlling the operation of the spectrometer 20. The control electronics 52, for example, may control the operation of the light source 22, the actuator assembly 31, the detector 48, temperature control elements (e.g., for the light source or detector), and data transfer to and/or from the spectrometer. In one embodiment, the control electronics 52 may be integrated onto a single PC board within a housing of the spectrometer. The control electronics 52 may also comprise one or more discrete component(s) and/or one or more integrated circuit component(s).

In one embodiment, the control electronics 52 may be adapted to communicate with an external device. The communication, for example, may comprise a wired or wireless communication port for communicating with an external computer, smartphone, tablet, personal data assistant (PDA), network or the like. A wired communication port, for example, may comprise a parallel, serial, universal serial bus (USB), FireWire™, IEEE 1394, Ethernet, modem, cable modem or other wired communication port known in the art. A wireless communication port, for example, may comprise an antenna for wireless communicating with an external device, such as via and infrared, Bluetooth, IEEE 802.11a/b/g, IrDA, a wireless modem or other wireless communication port known in the art. The control electronics 52 may be powered from a battery for a portable device or may include a power input for receiving power from an external supply as known in the art. A battery or power supply circuit (e.g., a rectifier) may be located within a housing of the spectrometer 20.

In Raman spectroscopy, the spectrometer 20 operates to detect a Raman spectrum of a sample 28. In order to detect the Raman spectrum, the light source 22 is activated to generate an incident beam 26 of excitation radiation, such as generating a laser incident beam in a laser light source. In one embodiment, for example, the temperature of the light source 22 is controlled to control the output frequency of the incident beam 26 generated by the light source 22. The incident beam 26 of excitation radiation passes through the filter 24, which removes spurious emissions from the incident beam. The incident beam 26 is reflected off the beam-splitter mirror 30 toward the sample 28. The incident beam 26 is focused onto the sample 28 by the output focusing lens 34.

The incident beam 26 generates Raman scattered light from the sample 28. The Raman scattered light is received by the output focusing lens 34 and transmitted back through the beam-splitter mirror 30. In this embodiment, the beam-splitter mirror 30 passes the Raman scattered light through the mirror 30 to the filter 38. From the filter 38, the Raman scattered light passes through the input focusing lens 40 and is focused onto a spatial filter 41 such as an aperture, slit or notch. The Raman scattered light is spatially filtered and diverges toward the collimating lens 42. The collimating lens 42 collimates the diverging Raman scattered light and transmits the light to the diffraction grating 44, which divides the Raman scattered light into spatial separated wavelengths and directs the wavelengths towards the detector element 48. The spatially separated wavelengths of the Raman scattered light pass through the detector focusing lens 50 and are focused into a focused band of radiation that represents the spatially separated wavelengths of the Raman scattered light. The focused band of radiation is further directed by the detector focusing lens 50 onto the detector 48.

In this particular implementation, the detector 48 comprises an array of individual transducers that each generate an electrical signal corresponding to intensity of the radiation received at each of the individual transducers. The electrical signals generated at the individual transducers of the detector represents the spatially separated wavelengths of the Raman spectrum of the sample 28. The electrical signals are read from the detector by the control electronics 52. In one embodiment, for example, the spectrometer 20 may then present the Raman spectrum detected to a user such as via a display or indicator on the spectrometer itself. In another embodiment, the control electronics of the spectrometer 20 may comprise a look-up table stored in a data storage element (e.g., memory, tape or disk drive, memory stick or the like). In this embodiment, the control electronics 52 compares the signal from the detector with the values stored in the look-up table to determine a result of the Raman scan. The spectrometer 20 then presents the result to a user such as via a display or indicator on the spectrometer. The result, for example, may indicate the presence or absence of one or more chemicals or substances in the sample and may further indicate an amount or concentration of a chemical or substance detected by the spectrometer.

In other implementations, the detector 48 may comprise one or more individual transducers that rapidly scan for one or more anticipated spectral features (e.g., Raman features). An example such system is disclosed in U.S. patent application Ser. No. 13/161,485 entitled "Spectrometer" and filed by Carron et al. on Jun. 15, 2011, which is hereby incorporated herein by reference in its entirety for all that it teaches and suggests.

In one embodiment, the spectrometer and a method of obtaining a spectrum of a sample utilize an observation that a fluorescence spectrum is broad and does not change meaningfully with small changes (e.g., ~2 nm or less) in the laser wavelength. This observation has previously led to a technique of changing the temperature of a specific type of laser called a Distributed Bragg Reflector (DBR) which permits specific wavelength emissions that are closely spaced and well correlated with the laser temperature. Similarly, a dual wavelength laser package with the wavelengths closely matched can produce a shift in the Raman, while the fluorescence is at least generally constant (e.g., within 30 wavenumbers). Also, a small shift in Raman can be produced by small movements of one or more dispersive element in the spectrometer.

All of the above methods require multiple laser wavelengths at well-defined spacing or mechanical movement of the dispersive element of the spectrograph. These methods have only been demonstrated in relatively large Raman systems and all have a significant cost. The two major costs in a handheld Raman system are the laser and the detector.

An embodiment of a spectrometer and method of obtaining a single spectrum of a sample with a single laser source operating at a single wavelength. The single spectrum may be used to simulate the effect of multiple laser sources or a single laser source producing different wavelength excitation signals. In this manner, a single, stable laser source may be used to generate a single Resonance Raman spectrum at a single wavelength, and the single spectrum may be used to generate multiple simulations of shifted spectra without having to take a plurality of individual physical spectra.

Figure 3A:
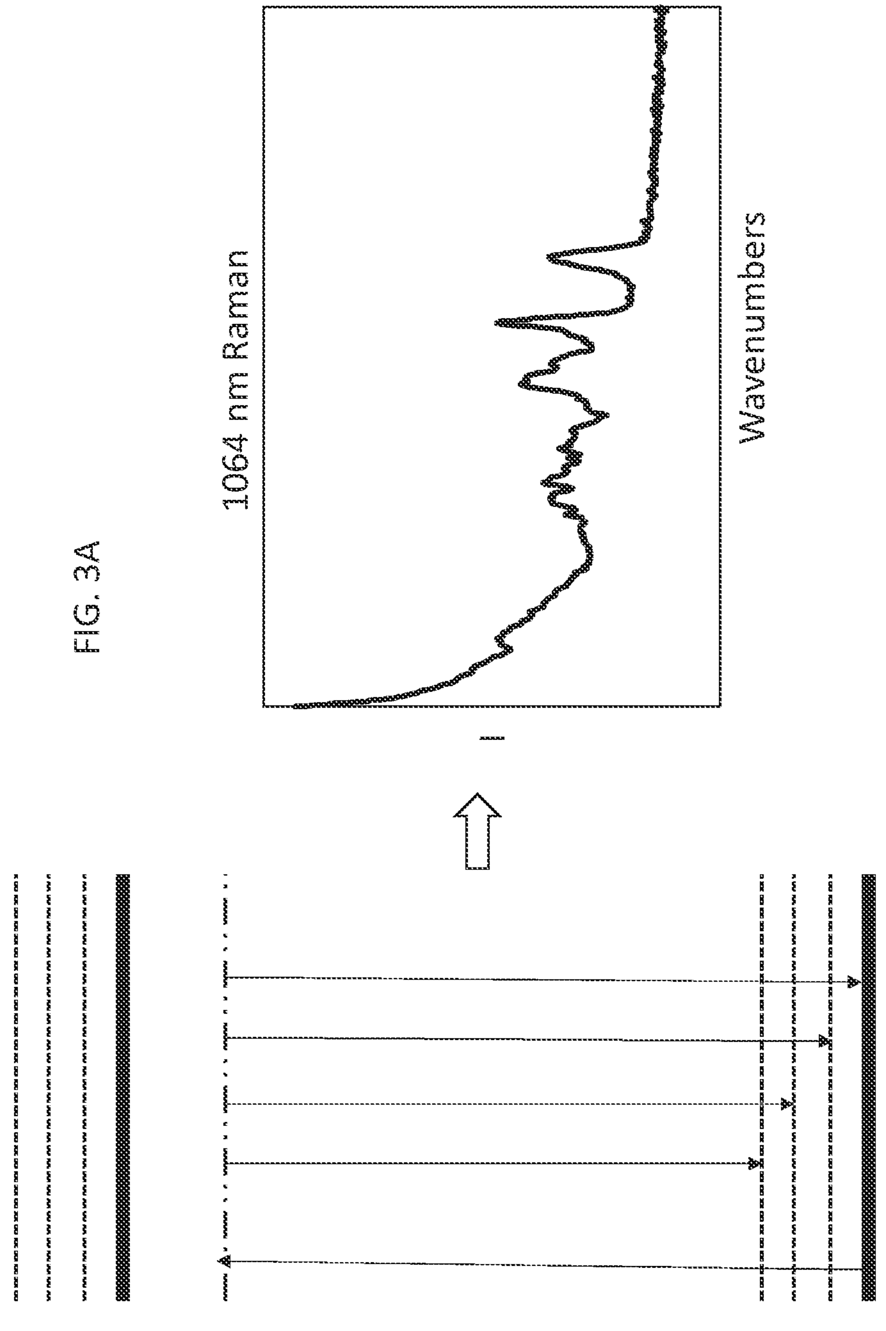
FIG. 3A illustrates an approach to reduce fluorescence by using a laser that does not overlap with an electronic state within a sample.
Figure 3B:
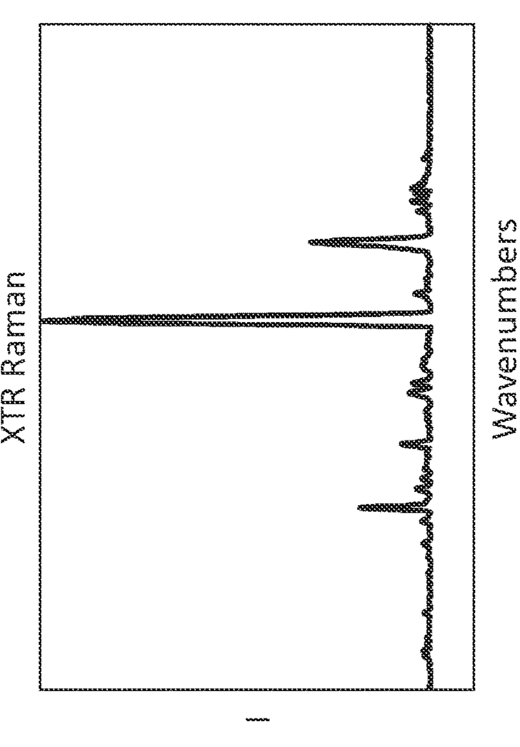
FIG. 3B illustrates an example method of identifying a sample spectrum using a simulated multiple frequency spectroscopic approach.
Figure 3B:
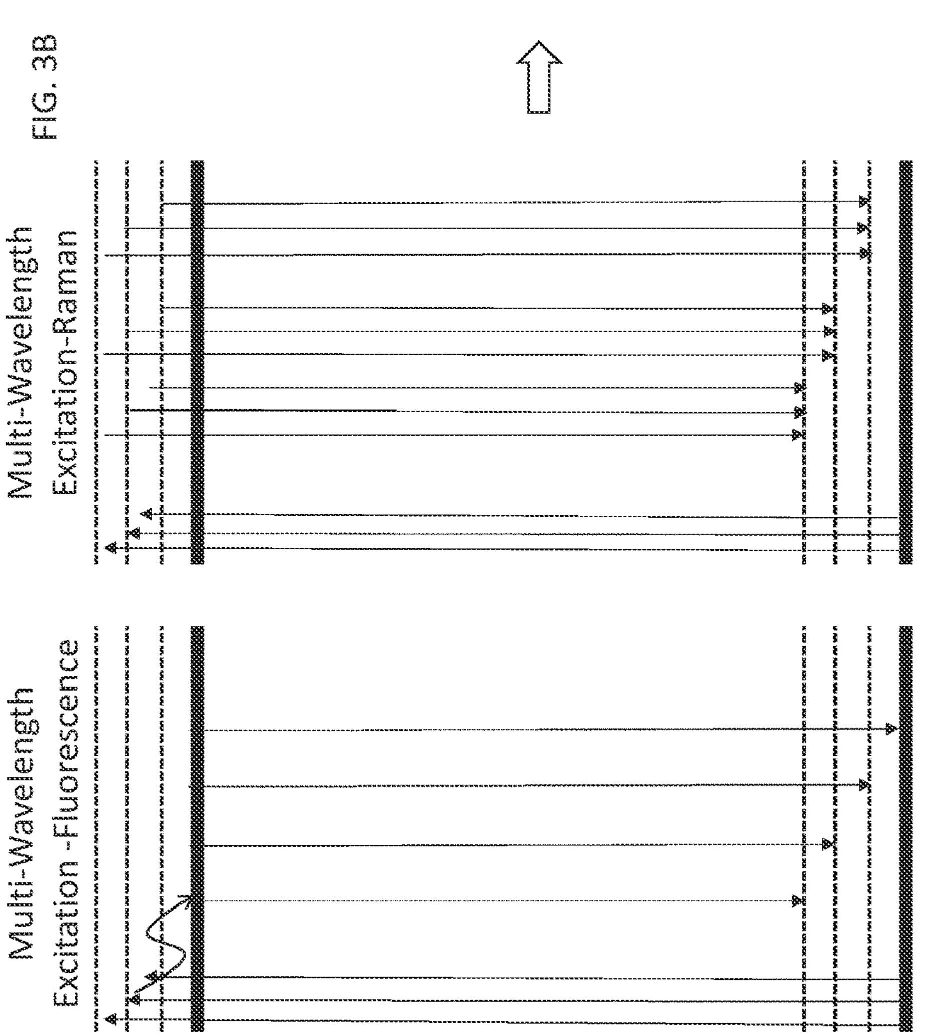

FIG. 3B shows a method of identifying a sample spectrum using a simulated multiple frequency spectroscopic approach. In this example, the fluorescence does not change with multiple wavelength excitation while the Raman energy shifts with multiple wavelength excitation. By using a mathematical method to simulate a shift in wavelength, the Raman spectrum of a sample can be extracted from a single spectrum including fluorescence without the need to take a plurality of spectra or use a plurality of excitation wavelengths.

In this embodiment, the spectrometer is adapted to receive a Resonance Raman spectrum and to distinguish Resonance Raman components that would shift with the excitation wavelength and fluorescence components that would not shift through the process provided herein. In one embodiment, for example, the spectrometer and method of obtaining a spectrum may provide a number of simulated shifts and their spacing.

Figure 5:
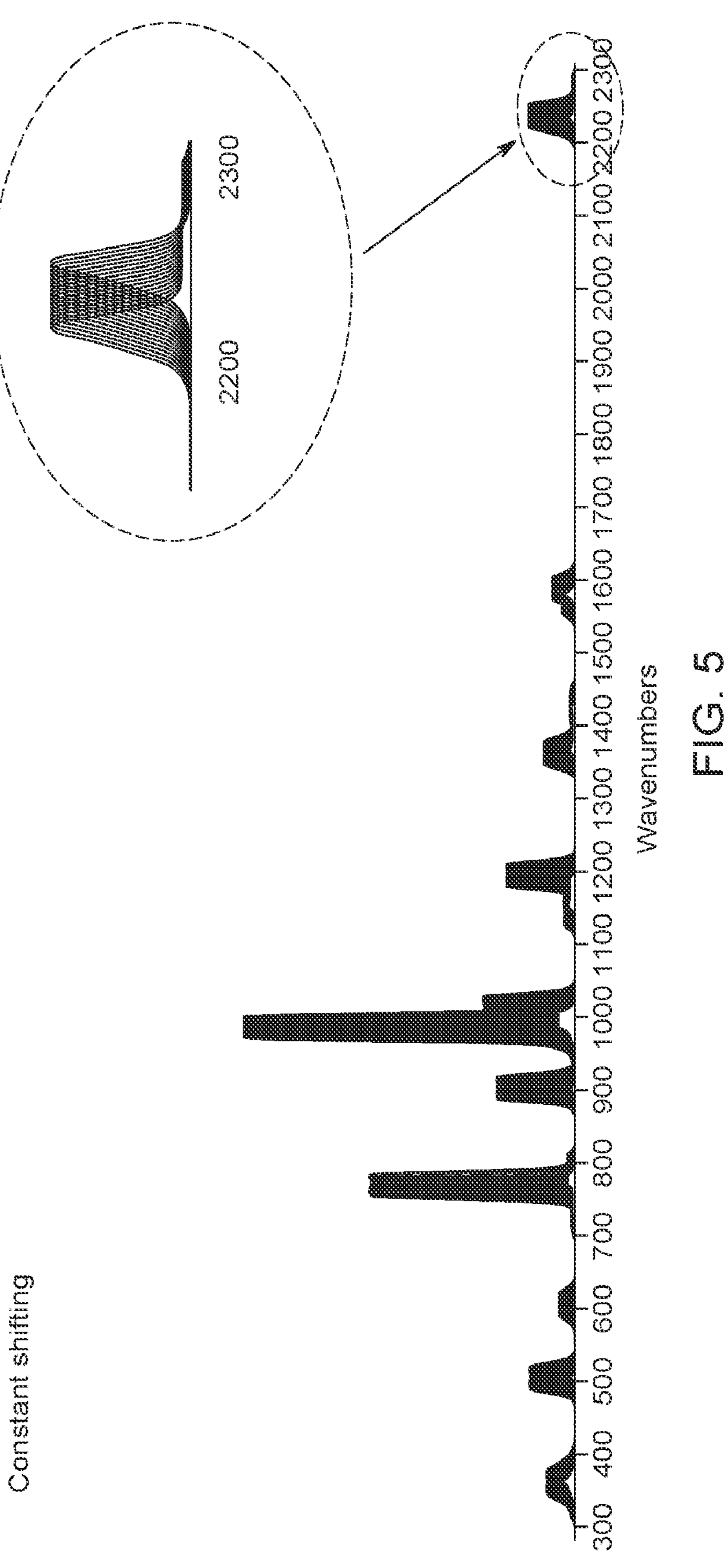
FIG. 5 shows an example of a method of processing spectrum data by performing a plurality of constant shifts of spectral data (e.g., pixel data, wavenumber data, wavelength data, energy data, or the like) from the detector for a single spectrum taken at a single wavelength a plurality of times to obtain a plurality of shifted spectra data that can be used to determine a resonance Raman spectrum for the sample by eliminating a portion of the spectrum attributable to fluorescence.

The spectral resolution of the resulting spectrum due to shifting excitation is strongly dependent on the amount of shift and the number of shifts. This is very limited with lasers and is restricted by the physical properties of the laser materials. In fact, DBR lasers are only available at long wavelengths with the current range of 780 nm and above. There is one report of a laser near 600 nm. The interesting range for Resonance Raman is often at much shorter wavelengths. It is often empirically reported that the number of molecules which exhibit Resonance Raman increase proportional to the reciprocal of the wavelength. This means that the sequential shifting of excitation by a small amount is only possible in the ~700 nm and above region. This is illustrated in FIG. 5. This is already a region where little Resonance Raman can be observed. The ability to simulate one or more shifts instead of physically or electronically shifting the wavelength of the laser and taking spectra at each of the actual shifts in wavelength enables any laser wavelength to be used for Resonance Raman and any laser capable of emitting a single wavelength.

In another aspect, a spectrometer is adapted to use a single spectrum to produce the fluorescent free result instead of requiring multiple spectra as in other methods. The requirement of multiple spectra may provide a disadvantage with handheld devices where hand or sample movement leads to different sampling conditions for with each spectrum acquired. In contrast, a single spectrum method ensures that the sample integrity is maintained.

In one embodiment, a spectrometer or method of obtaining a spectrum uses a virtual- or self-reference in which a reference is determined from a single detected spectrum. In contrast to this method, other methods to remove fluorescent backgrounds is done via a fit to a spectrum. The spectrum is created from a sensor which detects the Raman scattered light and the fluorescence. There is no distinction between the fluorescence photons and the Raman photons. This indistinguishability means that there is no certainty about the origin of the signal: whether it is fluorescence or Raman. The background removal, thus, often removes too much information: Raman signals. It also can remove too little which can lead to false material identification.

In this embodiment, a method is provided to create a distinction between the Raman signals and the fluorescence. This distinction is derived from the distinct processes for Raman and fluorescence. The Raman process is dependent on the laser wavelength. The fluorescence signal is expected to be generally independent on the laser wavelength at relatively minor shifts (e.g., within about 30 wavenumbers). By taking advantage of these differences, the spectrometer and method can separate components of a spectrum—a signal that originates in Raman and a signal that originates in fluorescence. This distinction allows the spectrometer and method of obtaining a spectrum to mathematically separate the signals and produce spectra that are pure Raman and spectra that are pure fluorescence. Unlike other methods that require multiple different laser wavelengths to distinguish Raman from fluorescence, the present embodiment is adapted to use a single spectrum taken at a single wavelength excitation signal.

FIG. 5 shows an example of a method of processing spectrum data by performing a plurality of constant shifts of spectral data (e.g., pixel data, wavenumber data, wavelength data, energy data, or the like) from the detector for a single spectrum taken at a single wavelength a plurality of times to obtain a plurality of shifted spectra data that can be used to determine a resonance Raman spectrum for the sample by eliminating a portion of the spectrum attributable to fluorescence. In this embodiment, the original spectrum is shifted in the same manner across an entire range of wavenumbers for the detected spectrum, which is considered a "constant shift" as used herein. In this embodiment, the individual shifts, for example, may be an equal number of wavenumbers each (e.g., 2 wavenumbers) and may comprise any number of shifted spectra. The original spectrum may be one edge of the plurality of shifted spectra such that the individual shifted spectra are obtained by shifting the spectra starting at the detected spectra. For example, the original spectrum may be positioned to the left of the plurality of simulated, shifted spectra (e.g., each shifted spectra is determined by shifting "n" wavenumbers to the right) or the original spectrum may be positioned to the right of the plurality of simulated, shifted spectra (e.g., each shifted spectra is determined by shifting "−n" wavenumbers to the left). In another embodiment, the original spectrum may be positioned within a range of simulated, shifted spectra (e.g., simulated, shifted spectra may be determined by shifting "−n" wavenumbers to the left and "m" wavenumbers to the right such that the original, detected spectrum is disposed within a range of simulated, shifted spectra).

Figure 6:
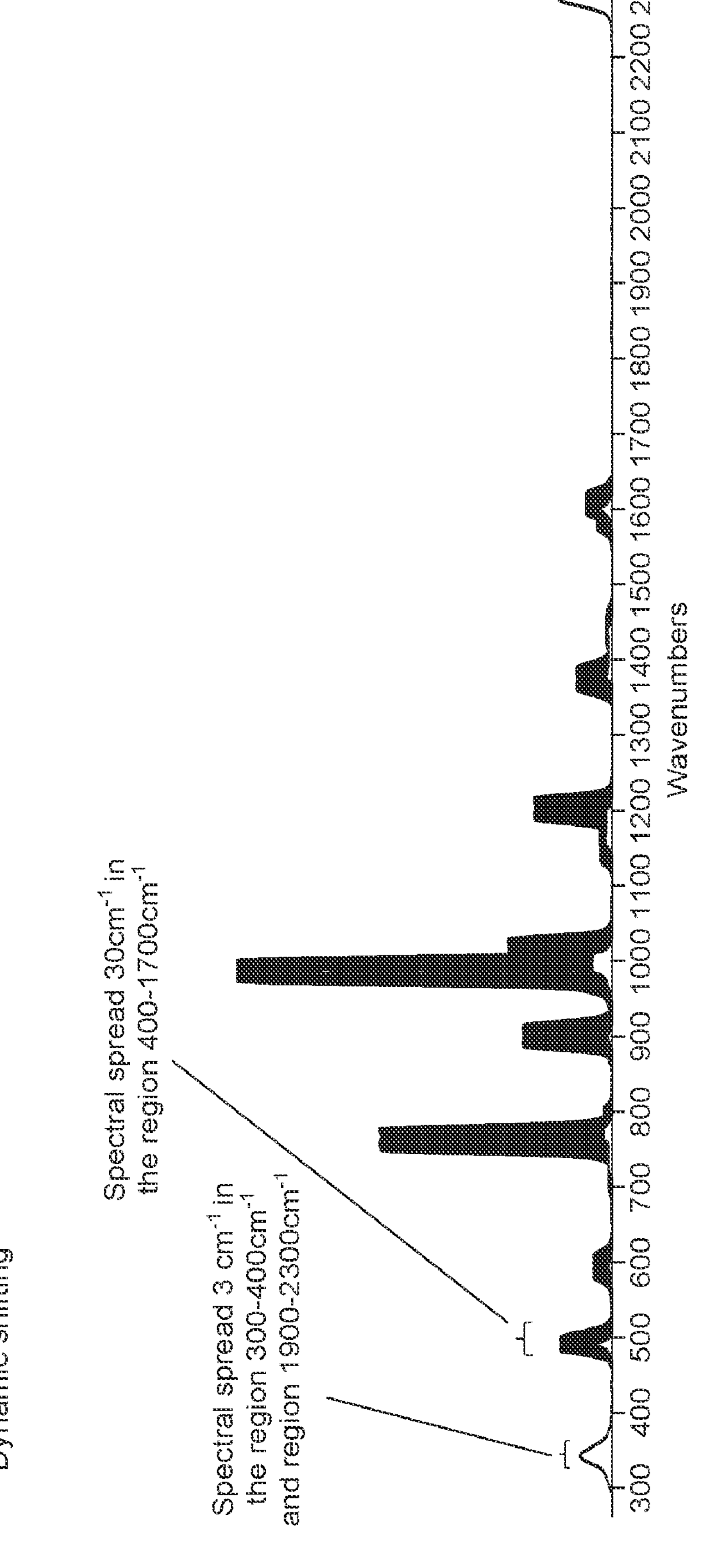
FIG. 6 illustrates another example of a method of processing spectrum data by performing a plurality of constant shifts of spectral data (e.g., pixel data, wavenumber data, wavelength data, energy data, or the like) from the detector for a single spectrum taken at a single wavelength a plurality of times to obtain a plurality of shifted spectra data that can be used to determine a resonance Raman spectrum for the sample by eliminating a portion of the spectrum attributable to fluorescence.

FIG. 6 shows another example of a method of processing spectrum data by performing a plurality of constant shifts of spectral data (e.g., pixel data, wavenumber data, wavelength data, energy data, or the like) from the detector for a single spectrum taken at a single wavelength a plurality of times to obtain a plurality of shifted spectra data that can be used to determine a resonance Raman spectrum for the sample by eliminating a portion of the spectrum attributable to fluorescence. In this embodiment, the original, detected spectrum is shifted in a dynamic manner such that the shift is not equal all the way across the original, detected spectrum. For example, perimeter regions of the spectrum obtained may be shifted a different amount than other regions of the spectrum. In one embodiment, for example, perimeter regions (e.g., at 300 to 400 $cm^{-1}$ and 1900 to 2300 $cm^{-1}$) are shifted a different amount (e.g., 3 $cm^{-1}$) than the remainder of the detected spectrum (shifted 30 $cm^{-1}$) as shown in FIG. 5. In this manner, noise and interference patterns corresponding to the lesser shifted regions can also be reduced. As with the embodiment shown in FIG. 4, the original spectrum may be located at one edge of the plurality of shifted spectra such that the individual shifted spectra are obtained by shifting the spectra starting at the detected spectra. For example, the original spectrum may be positioned to the left of the plurality of simulated, shifted spectra (e.g., each shifted spectrum is determined by shifting "n" wavenumbers to the right) or the original spectrum may be positioned to the right of the plurality of simulated, shifted spectra (e.g., each shifted spectra is determined by shifting "−n" wavenumbers to the left). In another embodiment, the original spectrum may be positioned within a range of simulated, shifted spectra (e.g., simulated, shifted spectra may be determined by shifting "−n" wavenumbers to the left for x simulated, shifted spectra and "n" wavenumbers to the right for y simulated, shifted spectra such that the original, detected spectrum is disposed within a range of simulated, shifted spectra). In one embodiment, the number of shifts to the left is the same as the number of shifts to the right (e.g., x=y) such that the original detected spectrum is disposed in the center of the simulated, shifted spectra.

Figure 7:
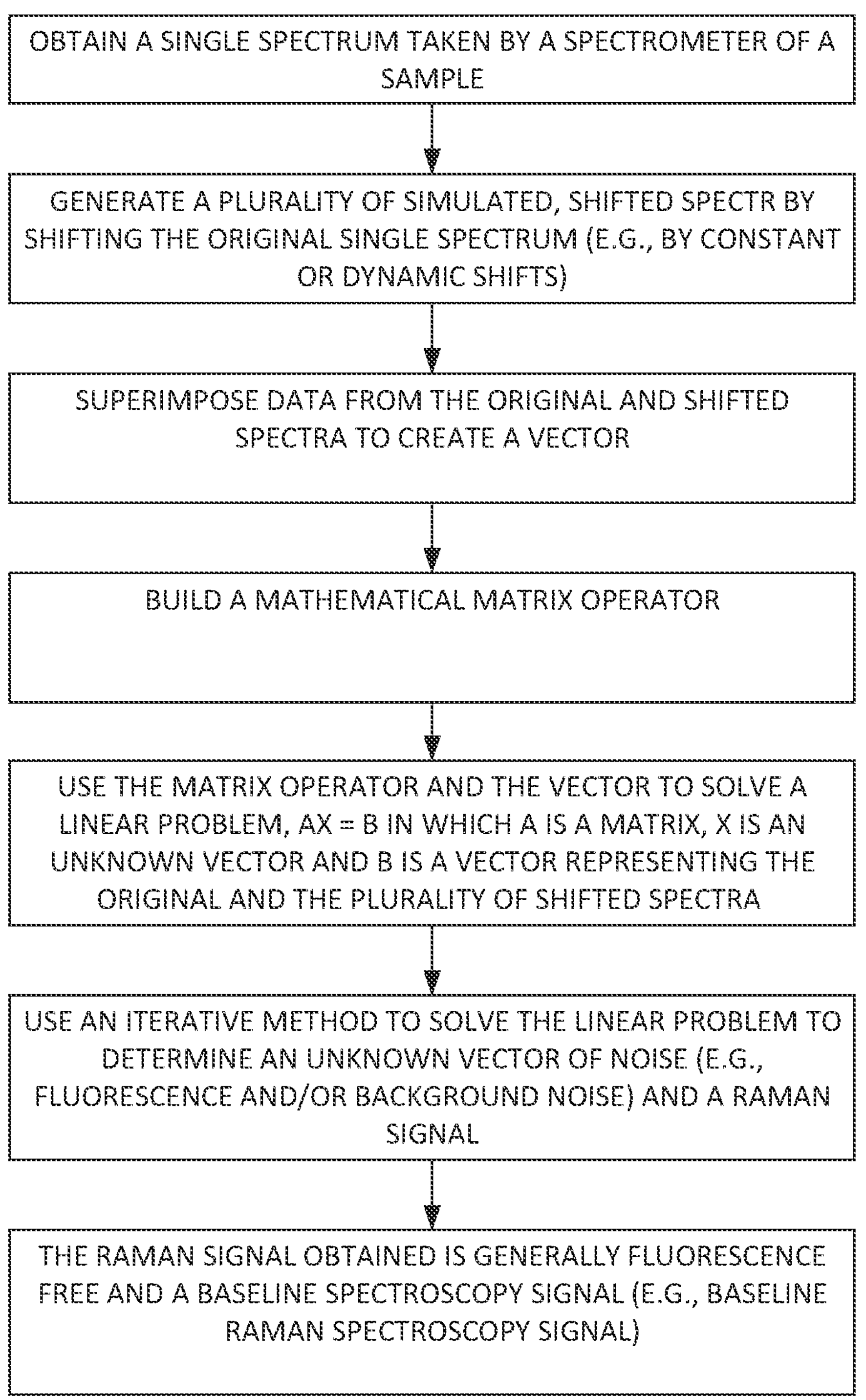
FIG. 7 is a flowchart showing an example process of removing fluorescence from a resonance Raman spectrum.

FIG. 7 is a flowchart showing an example process of removing fluorescence from a resonance Raman spectrum. In this embodiment, a single spectrum is taken by the spectrometer using a single laser wavelength. A plurality of simulated, shifted spectra are obtained by shifting the original single spectrum (e.g., by constant shifts or dynamic shifts) such as described above with respect to FIGS. 5 and 6. Any number of shifts may be generated.

Data from the original single spectrum taken by the spectrometer and the plurality of simulated, shifted spectra are superimposed to create a vector representing the plurality of detected shifted spectroscopic signals. A mathematical matrix operator is also built. The matrix operator and the vector are used to solve a linear problem, Ax=B, where A is a matrix operator, x represents an unknown vector, and B represents the original single spectrum and the plurality of simulated, shifted spectra. In one variation, an iterative method may be used to solve the linear problem that determines an unknown vector of noise (e.g., fluorescence and/or background noise) and a Raman signal. The matrix A represents identity matrices of non-shifted background spectrum from the plurality of shifted spectra measurements. The Raman signal obtained is generally noise (fluorescence and/or background noise) free and is a baseline spectroscopic signal (e.g., baseline Raman spectroscopic signal).

EXAMPLES

Figure 8:
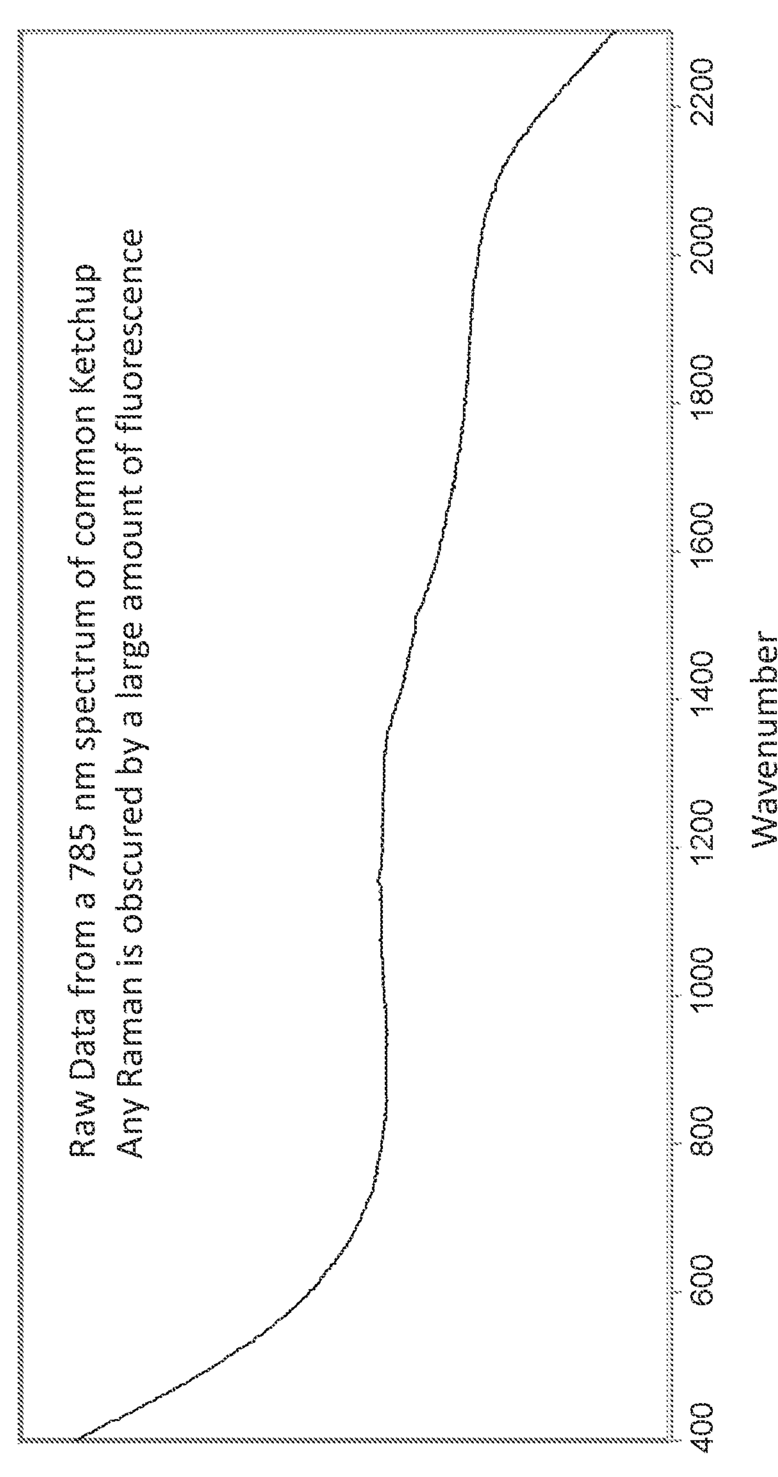
FIG. 8 illustrates a Raman spectrum of ketchup.

Ketchup: It may be desired to observe a small amount of material that produces resonance Raman to enhance its signal above other material. An example is ketchup which is mostly tomato material. An important component of tomato-based products is Lycopene. It is present in ketchup at trace levels around 10 mg/100 grams of ketchup or about 100 ppm. This is normal beyond the detectability of normal Raman scattering, but with a resonance enhancement it should be detectable. FIG. 8 illustrates a Raman spectrum of ketchup. The spectrum exhibits a large amount of fluorescence that obscures any Raman peaks.

Figure 9:
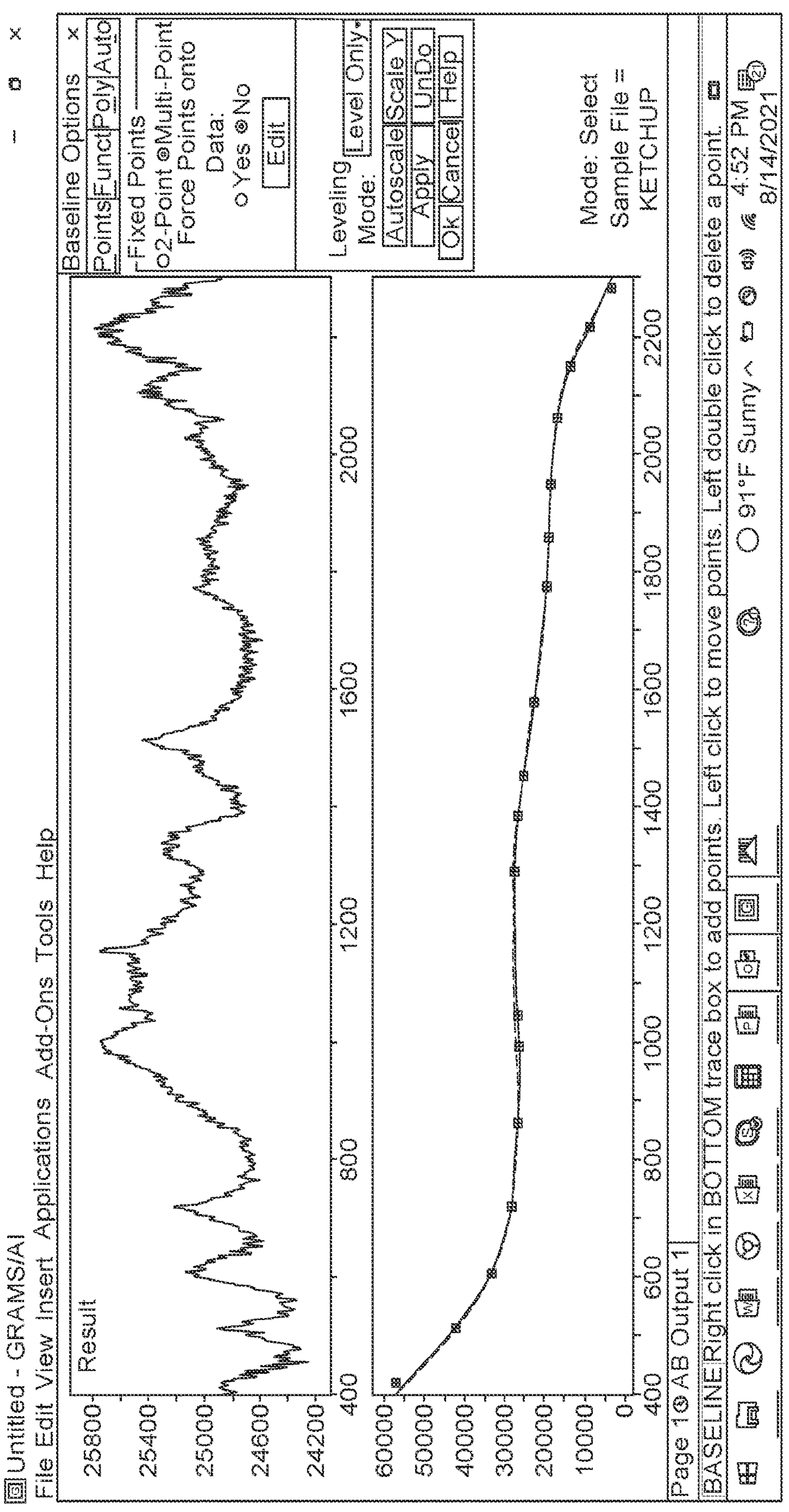
FIG. 9 is a screen shot of an example post acquisition spectral analysis program for the spectrum received in FIG. 8.
Figure 10:
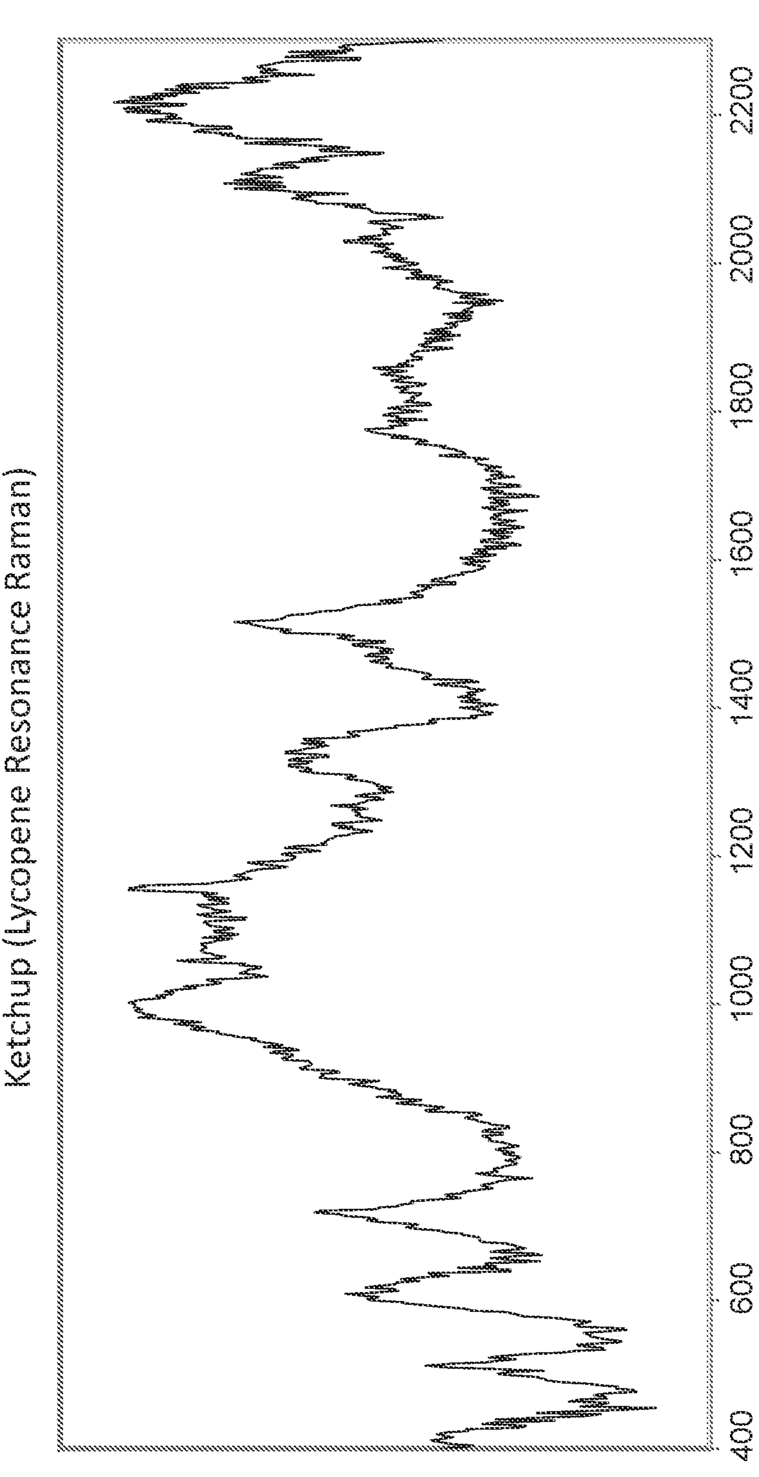
FIG. 10 illustrates the result of another example subjective analysis performed for the spectrum received in FIG. 8.

FIG. 9 is a screen shot of a popular post acquisition spectral analysis program. The program is GRAMS™ from Thermo. One feature of this program is Baseline Correction. This allows a user to choose points on the spectrum that represent the fluorescence. This is subjective baseline removal. FIG. 10 illustrates the result of this subjective analysis performed by one of the inventors, Keith Carron who has 40 years of experience with Raman spectroscopy. This spectrum indicates a peak around 1150 wavenumbers and perhaps 1520 wavenumbers. There are also many peaks that appear that could be real or artificial.

Material Identification is most commonly performed by calculating a Pearson's Correlation between the unknown spectrum and each individual library spectra. The Pearson's correlation uses a dot product between an unknown spectrum and a library spectrum. A non-zero baseline will contribute to the dot product and it will decrease the specificity between the dot products of the different library spectra. To overcome this problem, it is good practice to remove non-informational intensities in the baseline of the spectra.

Figure 11:
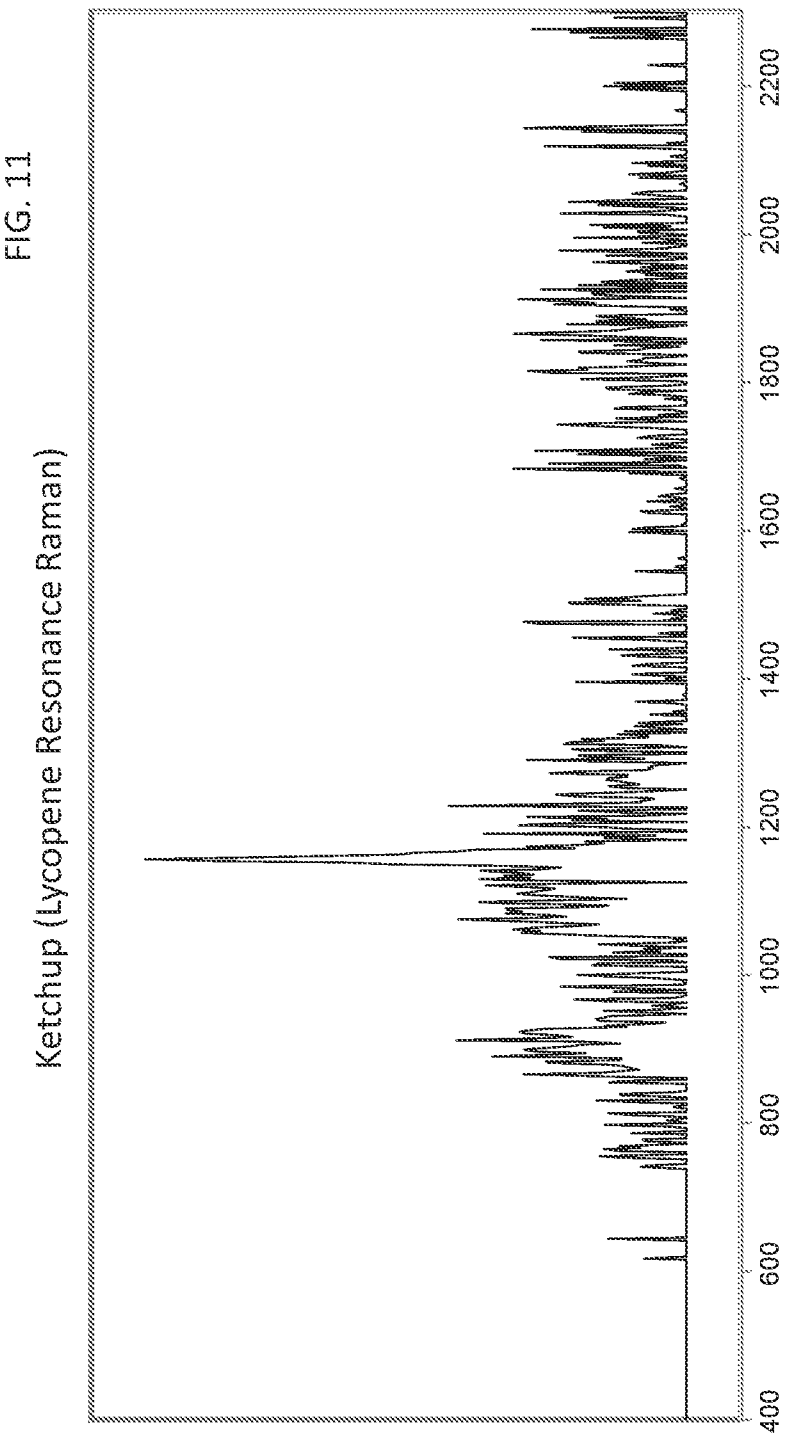
FIG. 11 illustrates a result of a method to automate the baseline subtraction performed with a peak/valley location algorithm to identify all the of the "non-peak" data points for the spectrum received in FIG. 8.

Baselines can be removed subjectively by choosing baseline data points and creating a polynomial fit through those points to subtract from the spectrum. While effective, this method requires human interaction and is highly subjective. Keith Carron developed a method to automate the baseline subtraction that has been used commercially in MKS Technology, Inc instruments for both the dba company Snowy Range Instruments and Metrohm Raman instruments. It is performed with a peak/valley location algorithm to identify all the of the "non-peak" data points. It creates a continuous line through the baseline points and interpolate between points under the peak. This baseline is subtracted from the raw data to produce a flattened spectrum. As a final step, noise is removed by subtracting a value equal to peak-to-peak noise level. This is illustrated in FIG. 11. This automated process removes subjectivity, but it is seen that it only produced the 1150 wavenumber peak and did not produce a peak at 1520 wavenumbers.

Figure 12:
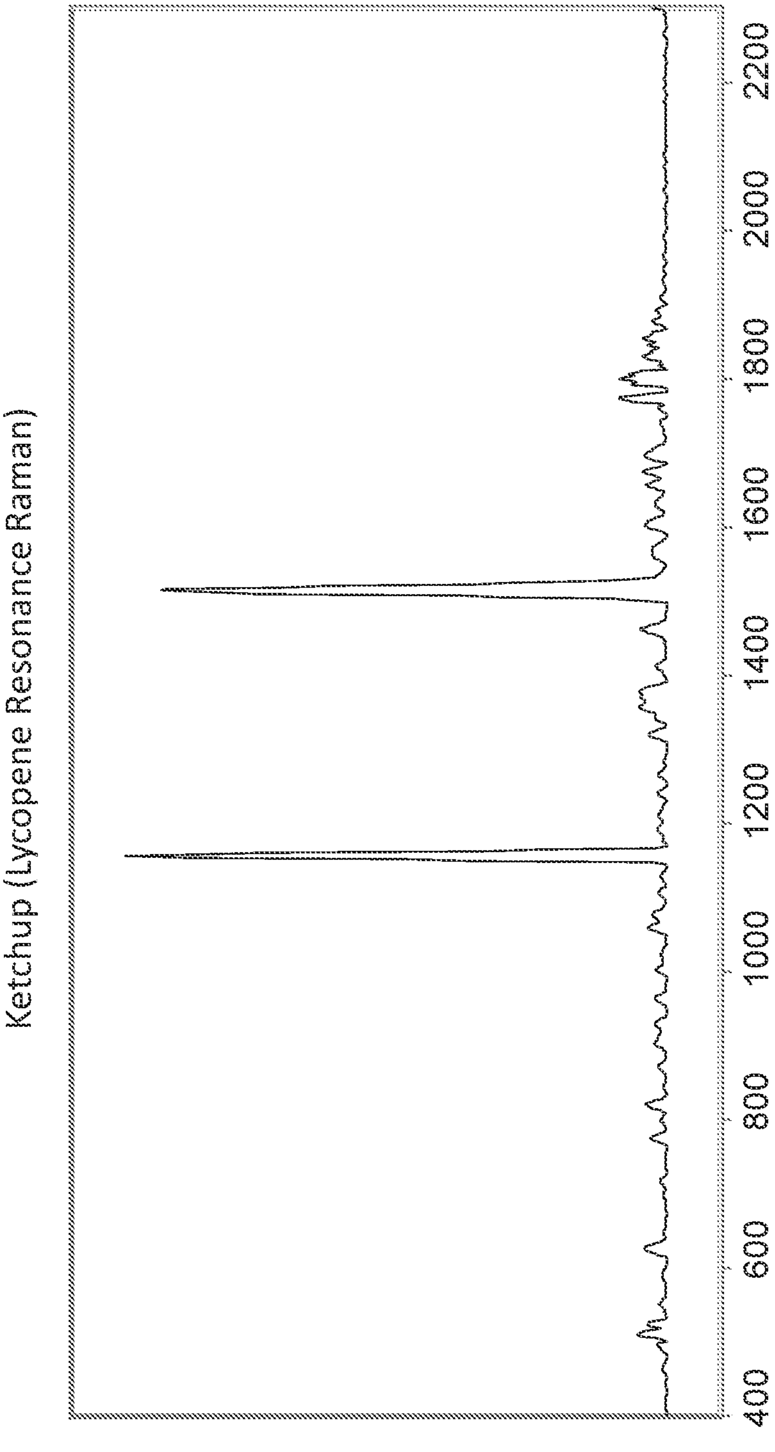
FIG. 12 illustrates the result when a method of self-referencing is used on the spectrum received in FIG. 8.

FIG. 12 illustrates the result when self-referencing is used. The same spectrum illustrated in FIG. 8 was used. It can be clearly observed that this method which develops a mathematical distinction between Raman and fluorescence clearly distinguishes two large peaks at 1120 and 1150 wavenumbers. This are properly identified from studies of pure lycopene*.

Figure 13:
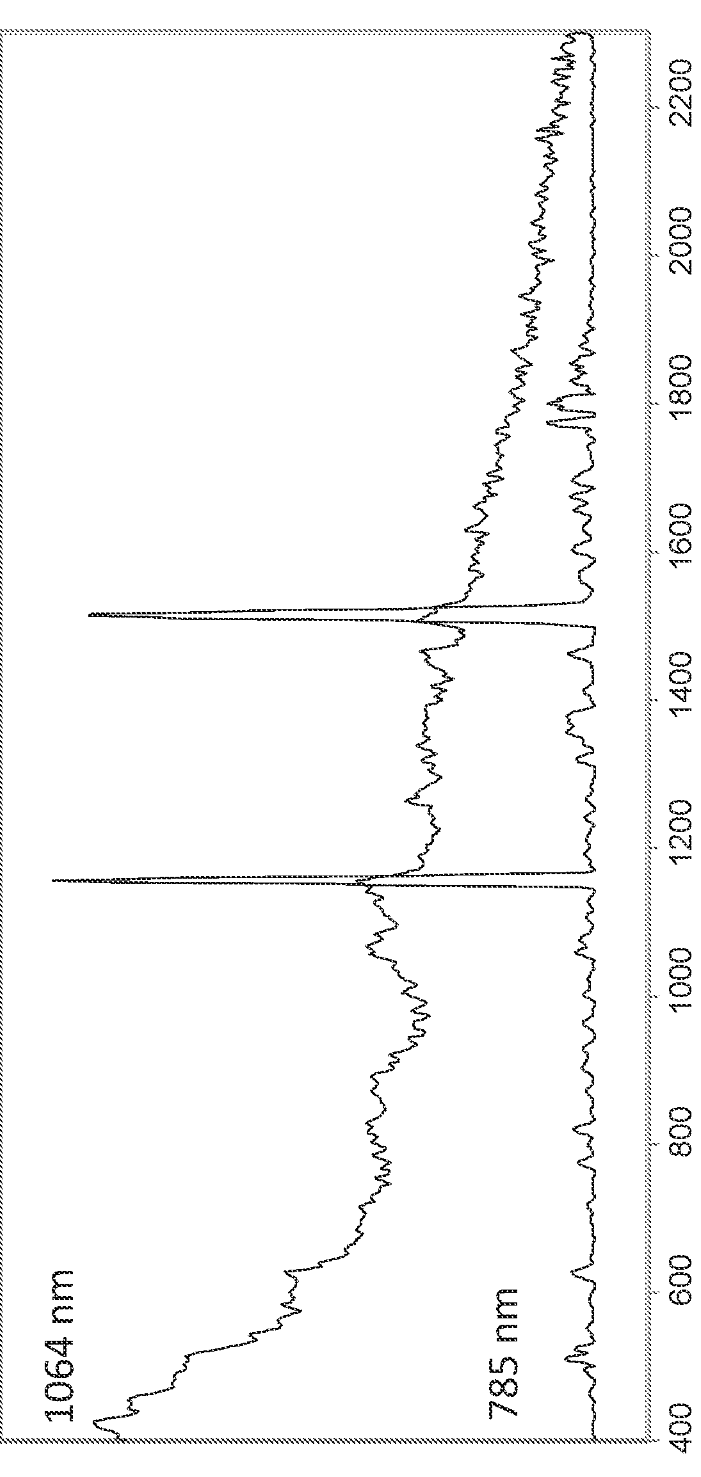
FIG. 13 illustrates an example of an advantage of a self-referencing method over a long wavelength analysis at 1064 nm.

FIG. 13 illustrates the advantage of a self-referencing method over a long wavelength analysis at 1064 nm. With 785 nm excitation some resonance enhancement is observed, and the material of interest exhibits a strong Raman signal. Excitation at 1064 nm is too low of an energy to produce and resonance Raman in the material of interest, lycopene.

Figure 14:
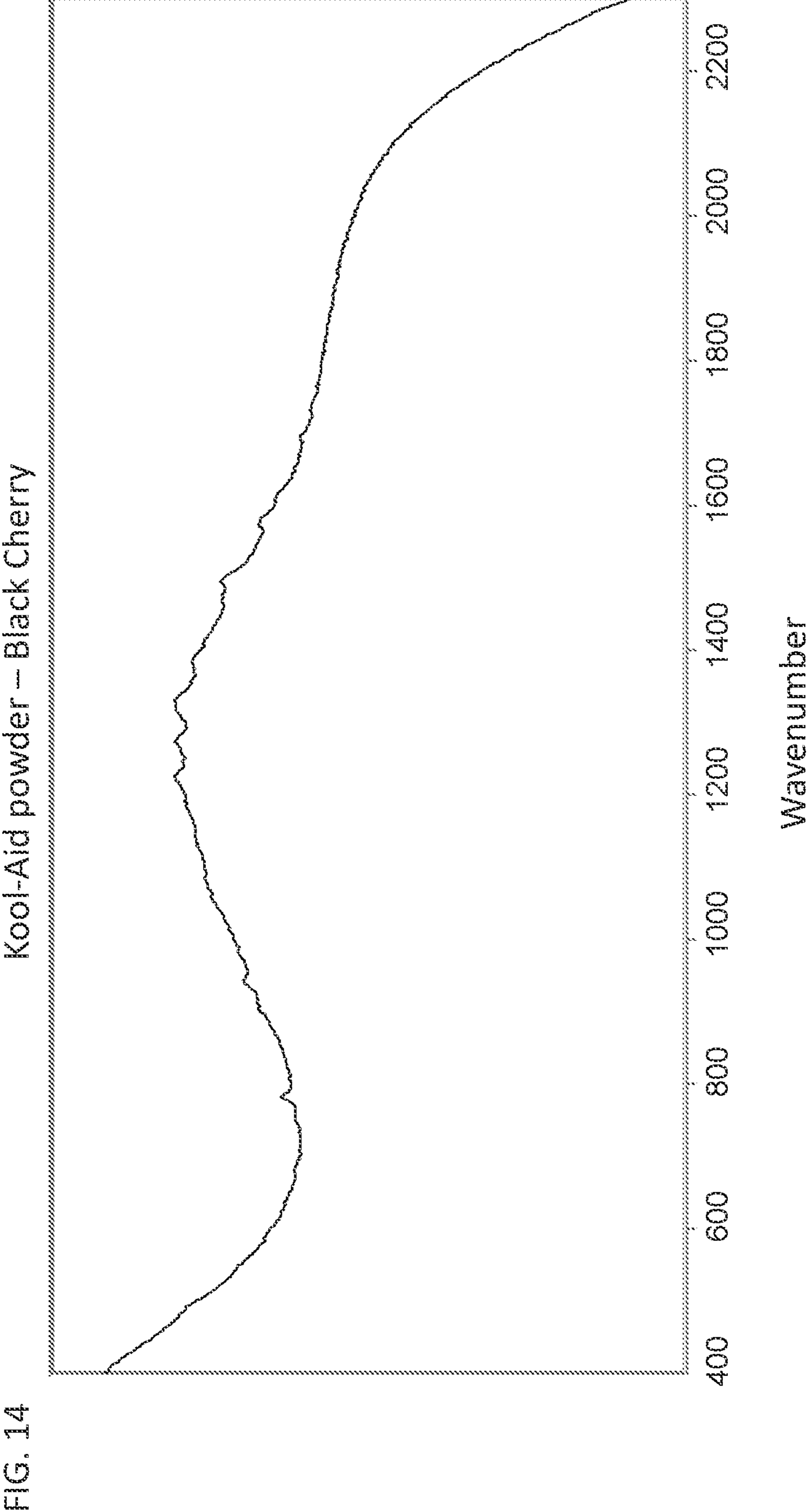
FIG. 14 illustrates an example Raman spectrum of Black Cherry Kool-Aid, a popular material for dyeing hair due to its dye content.

Flavored drink powder (Kool-Aid): Another example is a flavored drink powder with dyes added to create a color that matches the flavor. FIG. 14 illustrates a Raman spectrum of Black Cherry Kool-Aid, a popular material for dyeing hair due to its dye content. The dyes Blue1 and Red40 are present and due to their fluorescence it is difficult to obtain a Raman spectrum of this drink powder. The spectrum in FIG. 14 shows some feature that could be Raman peaks, but it is obscured by large amounts of fluorescence.

Figure 15:
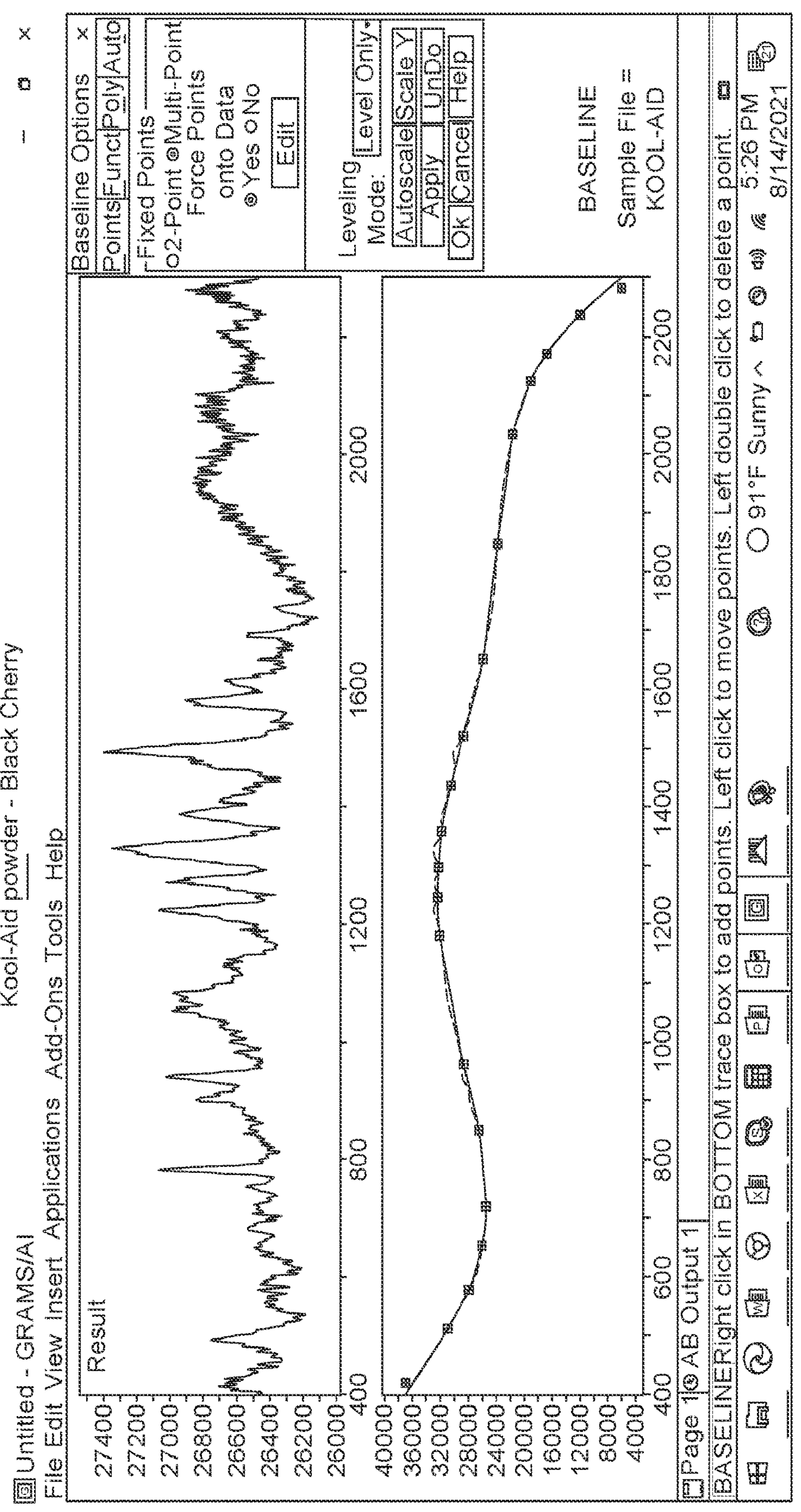
FIG. 15 illustrates a result of the subjective method of removing a baseline from the spectrum of FIG. 14.
Figure 16:
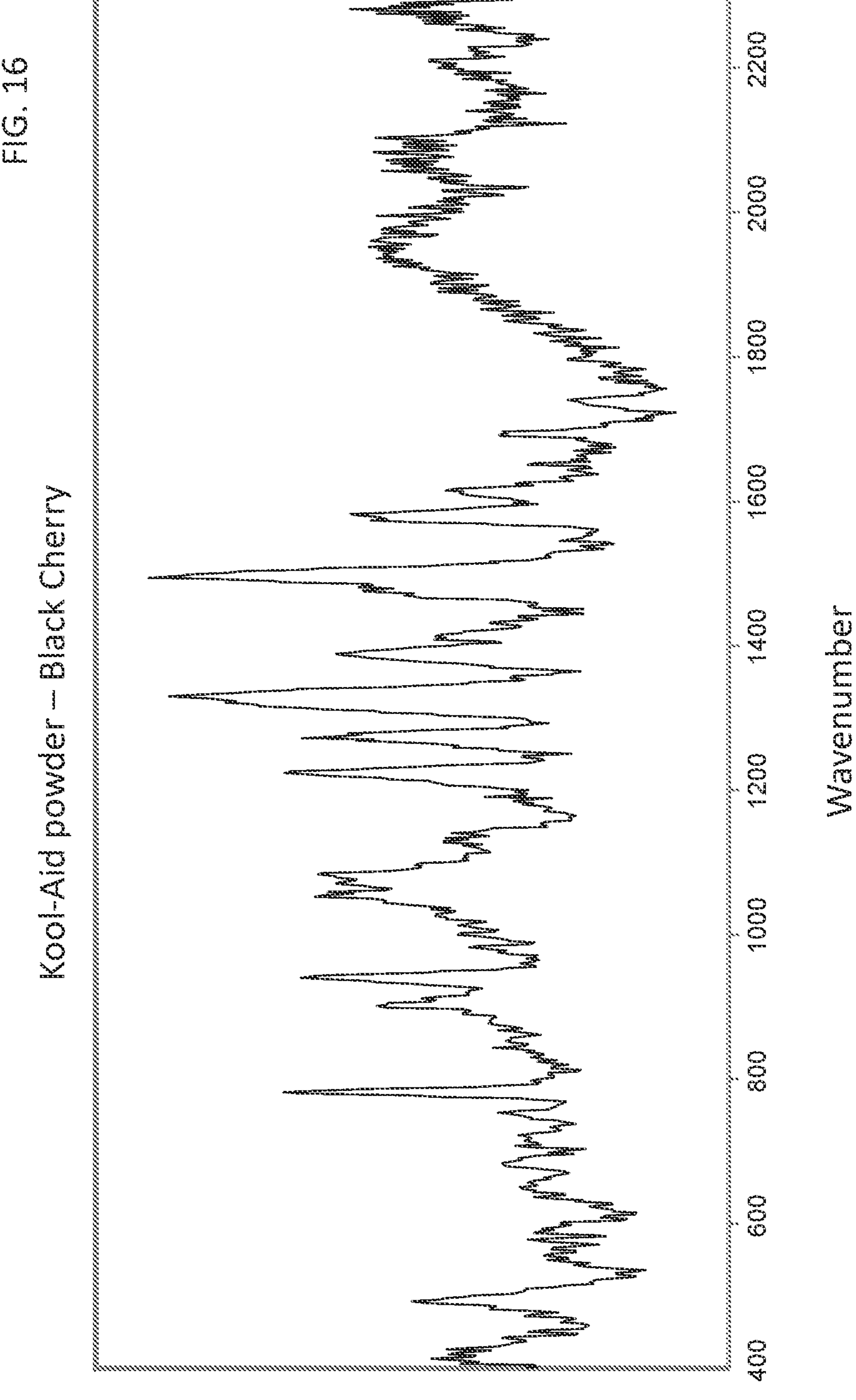
FIG. 16 illustrates a result of another subjective method of removing a baseline from the spectrum of FIG. 14.

FIG. 15 illustrates the subjective method of removing a baseline. FIG. 16 is the spectrum obtained from this method. It clear shows Raman features, but it also contains features that are not Raman related and which would create a poor Pearson's correlation to the pure Raman spectrum.

Figure 17:
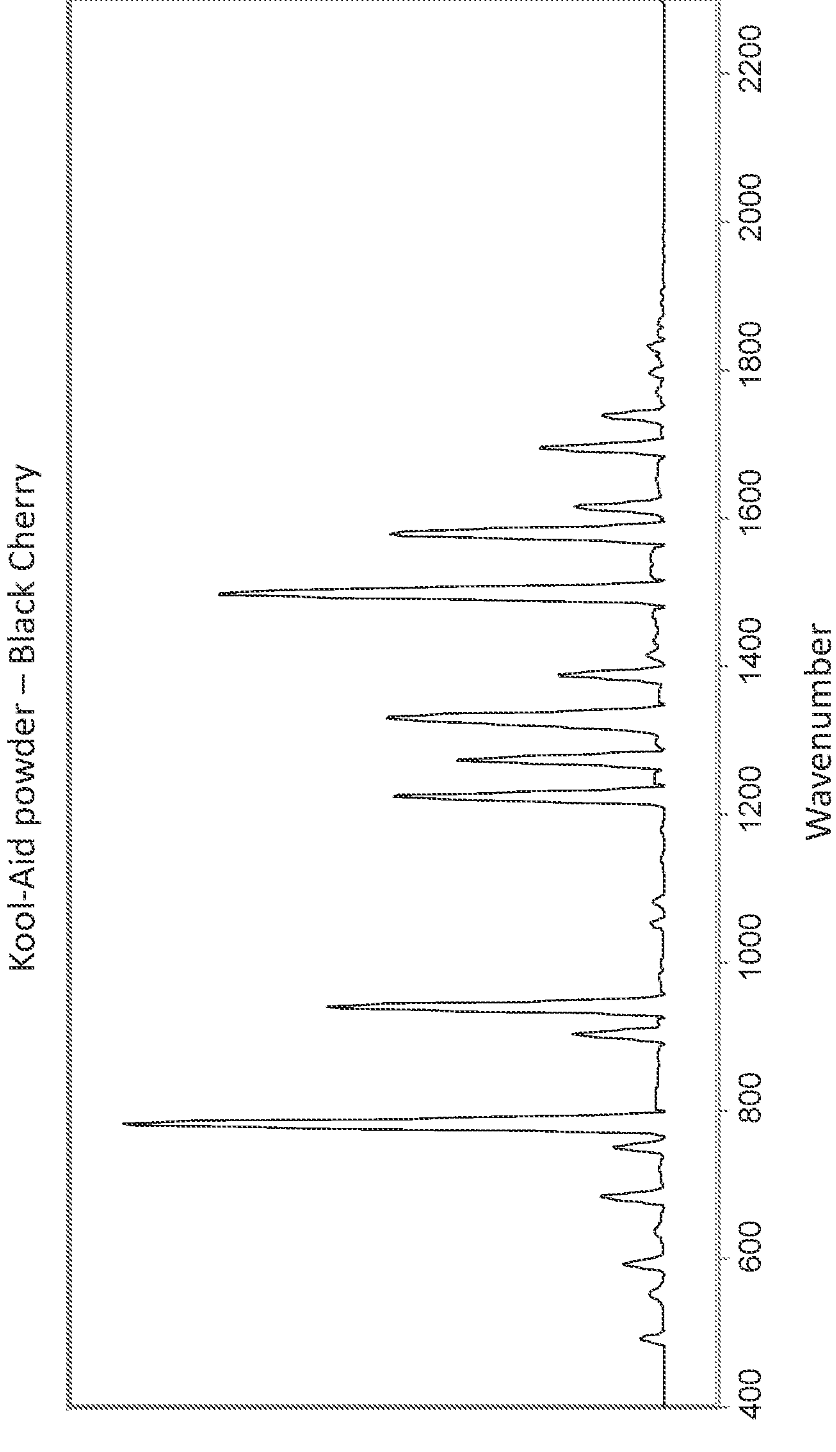
FIG. 17 illustrates a result of an objective, self-referencing method for removing a baseline from the spectrum of FIG. 14.
Figure 18:
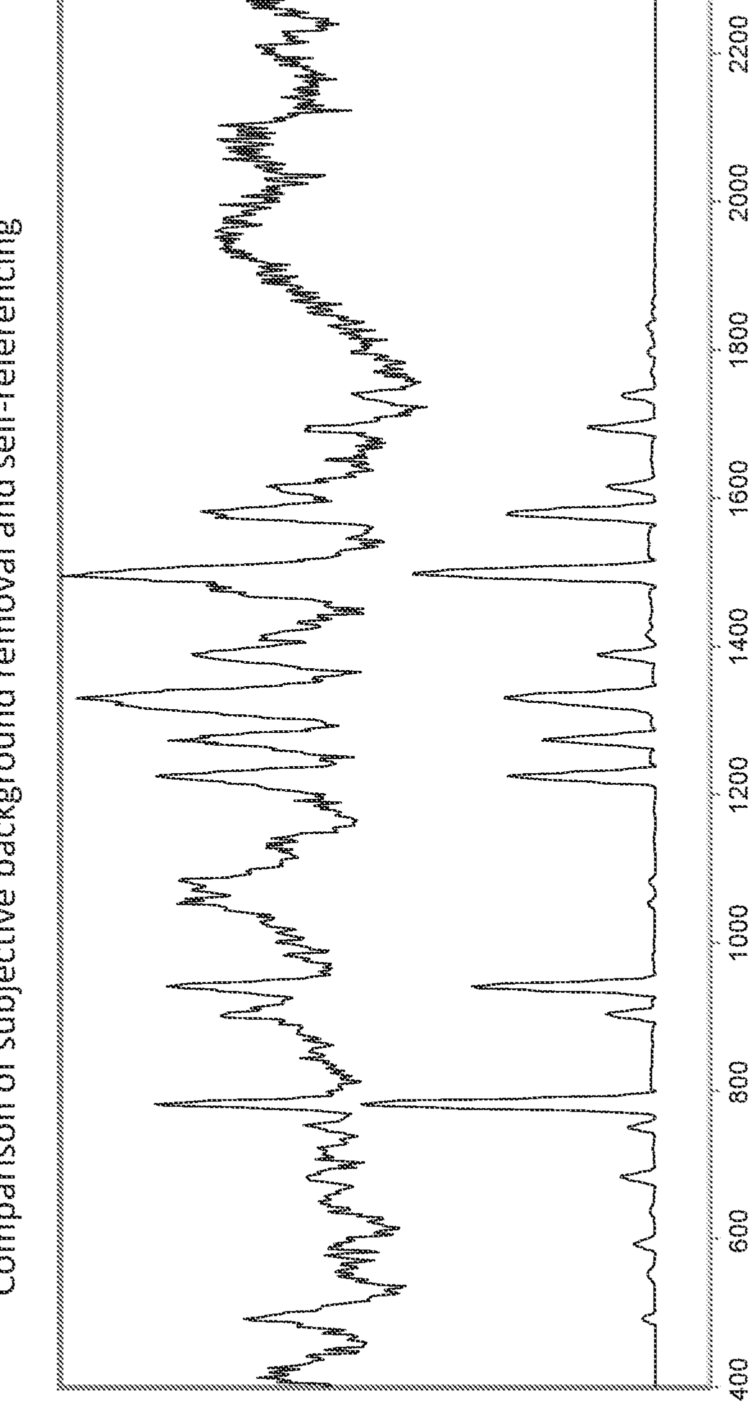
FIG. 18 illustrates a comparison of a subjective background removal and the objective self-referencing method described with reference to FIG. 17 for the spectrum of FIG. 14.
Figure 19:
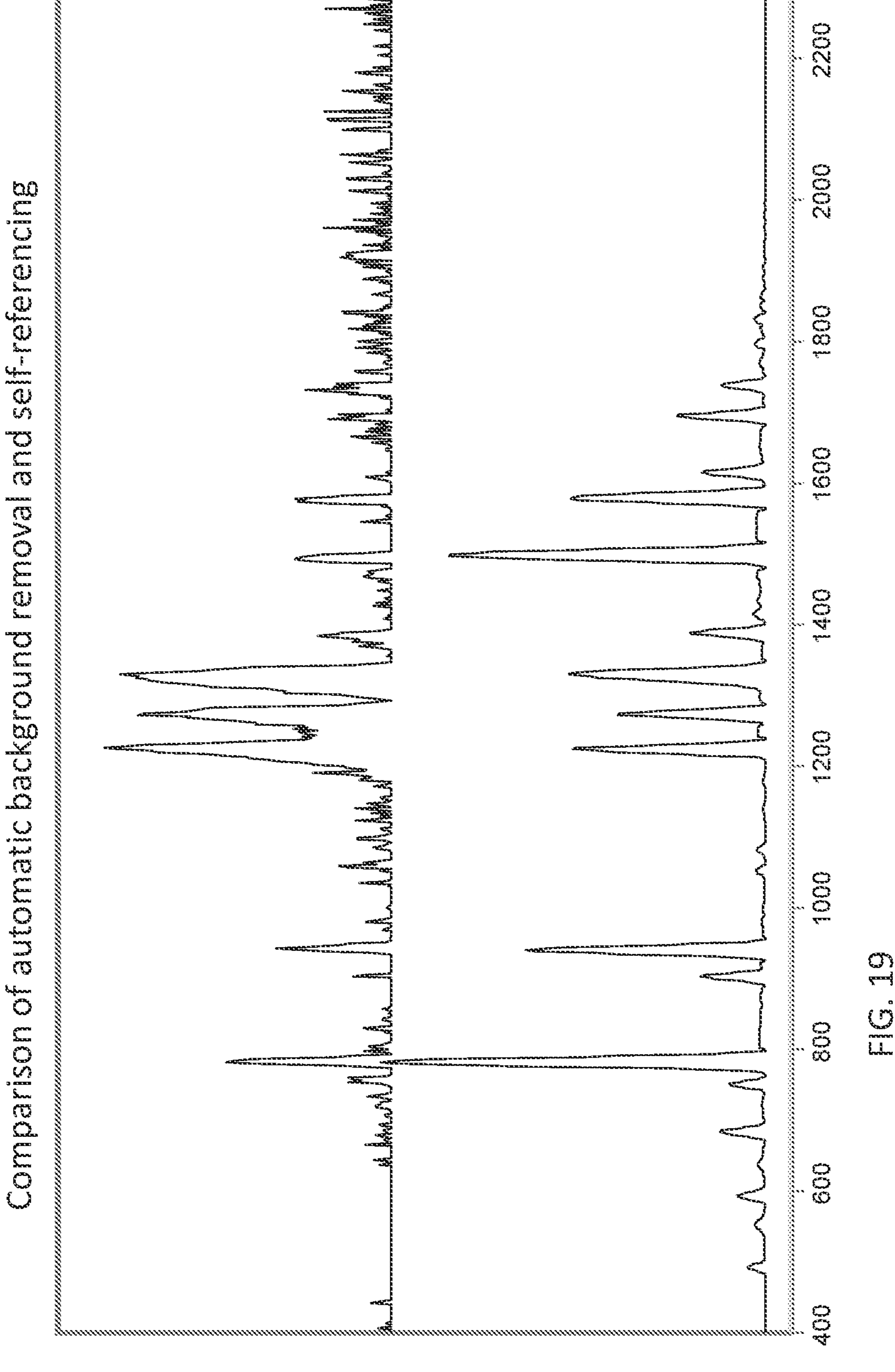
FIG. 19 illustrates a comparison of an automatic background removal method and an objective self-referencing method for the spectrum of FIG. 14.
Figure 20:
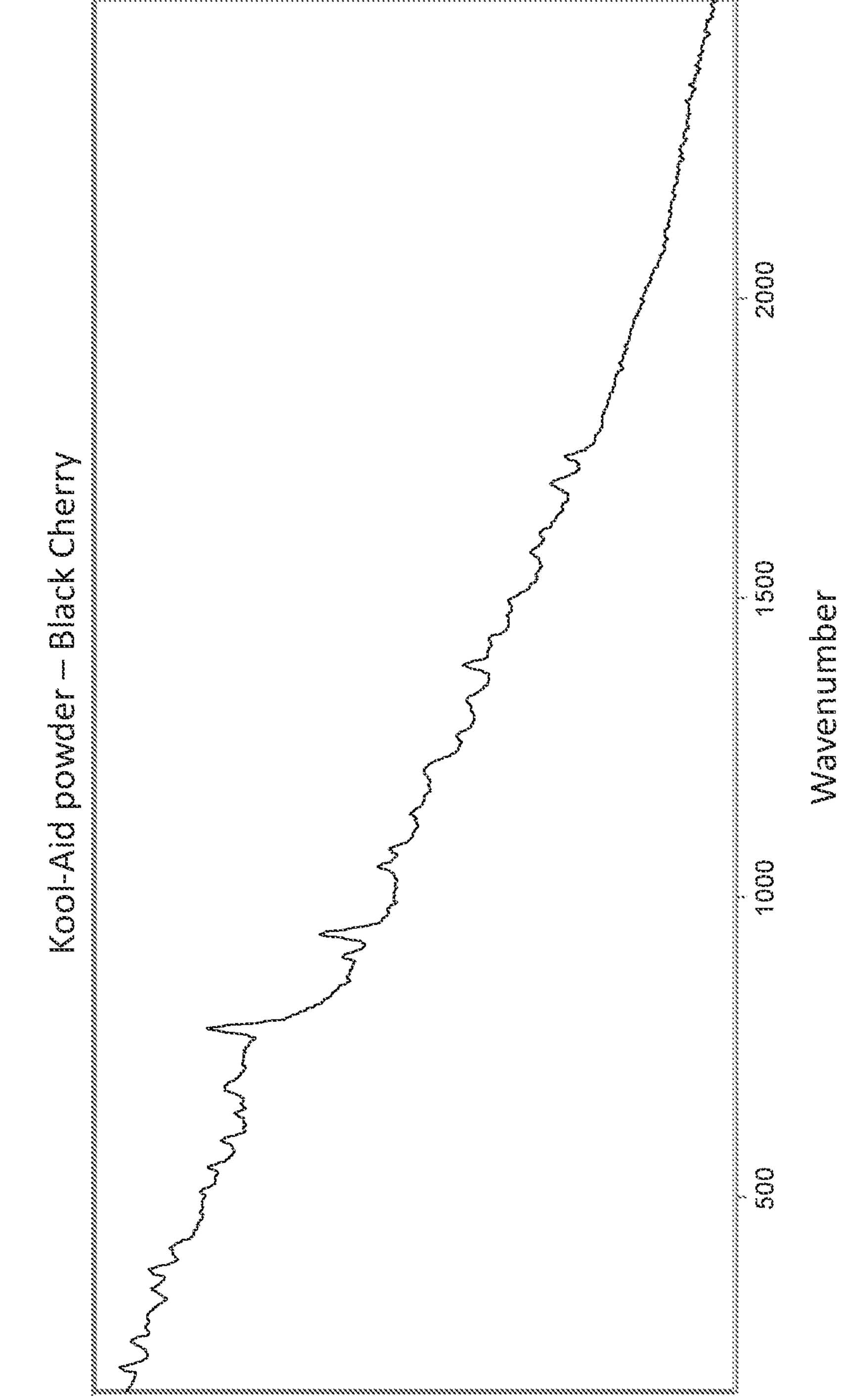
FIG. 20 illustrates a spectrum of the same material used for the spectrum of FIG. 14 when measured with 1064 nm excitation.

FIG. 17 illustrates the spectrum obtain by self-referencing. This is obtained from the spectrum shown in FIG. 14. It shows only Raman features. FIG. 18 compares the spectrum produced by subjective baseline removal and by self-referencing. FIG. 19 compares the spectrum produced by the automated baseline removal and self-referencing. In both cases the self-referencing method produces the best Raman spectrum. FIG. 20 illustrates the spectrum of this material when measured with 1064 nm excitation. Even at this low energy wavelength this powder drink contains significant fluorescence.

As described above, the ability to simulate one or more shifts instead of physically or electronically shifting the wavelength of the laser and taking spectra at each of the actual shifts in wavelength enables any laser wavelength to be used for Resonance Raman and any laser capable of emitting a single wavelength. FIGS. 21-25 show examples of spectra taken with a 532 nm green laser. By enabling different lasers that may create resonance with different color samples, the present technique allows resonance Raman to be obtained for a variety of samples.

Figure 21:
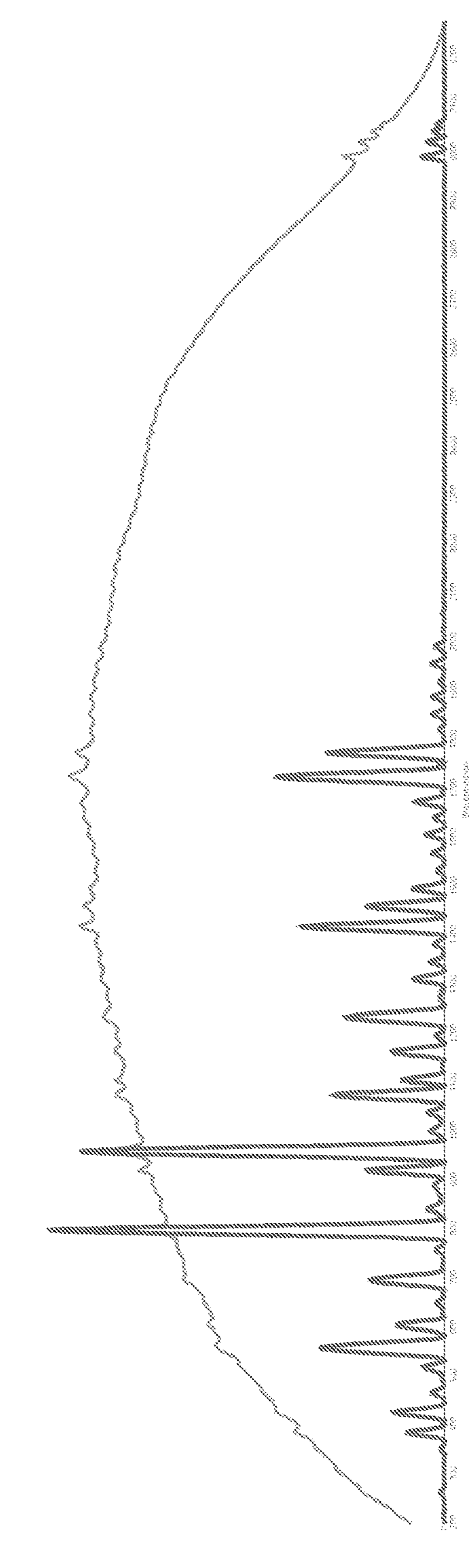
FIGS. 21-25 show examples of spectra taken with a 532 nm green laser.

FIG. 21 shows a sampled resonance Raman signal (green) for citric acid with fluorescence obscuring the underlying Raman spectrum (blue). After utilizing the present technique, the resulting resonance Raman signal provides the clear, baseline Raman spectrum identifiable as citric acid.

Figure 22:
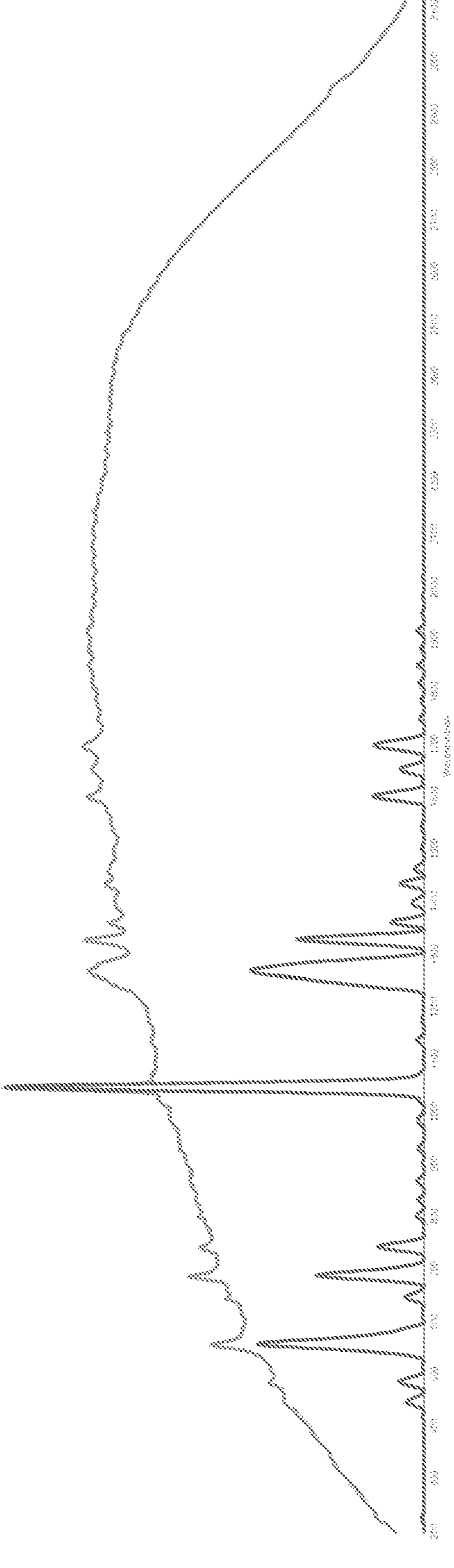

FIG. 22 shows a sampled resonance Raman signal (green) for L-Thyroxine with fluorescence obscuring the underlying Raman spectrum (blue). After utilizing the present technique, the resulting resonance Raman signal provides the clear, baseline Raman spectrum identifiable as L-Thyroxine.

Figure 23:
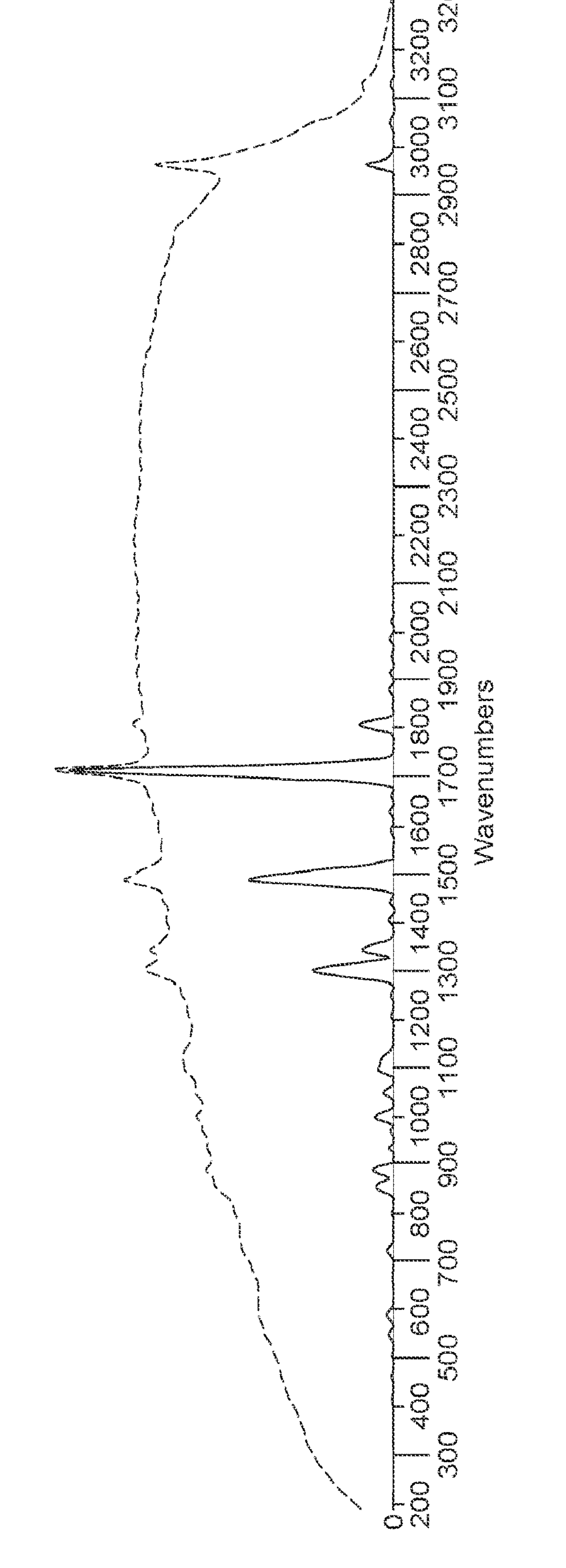

FIG. 23 shows a sampled resonance Raman signal (green) for walnut oil with fluorescence obscuring the underlying Raman spectrum (blue). After utilizing the present technique, the resulting resonance Raman signal provides the clear, baseline Raman spectrum identifiable as walnut oil.

Figure 24:
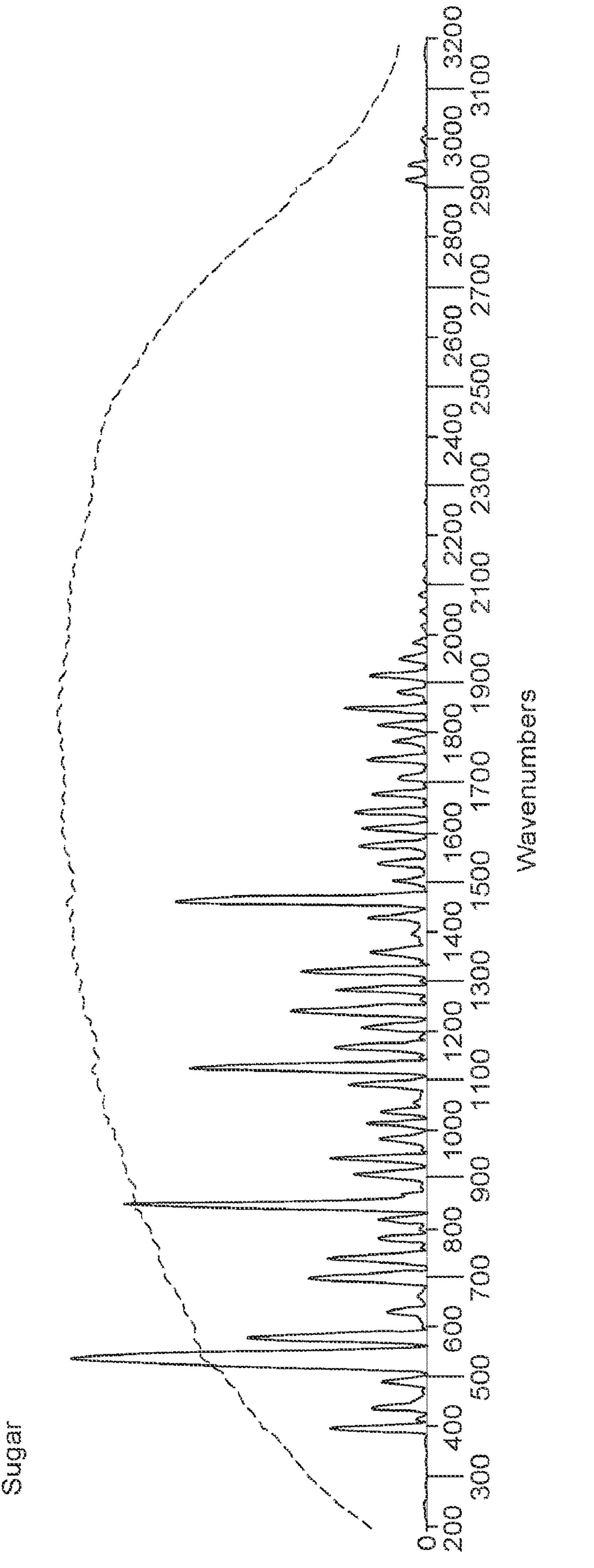

FIG. 24 shows a sampled resonance Raman signal (green) for sugar with fluorescence obscuring the underlying Raman spectrum (blue). After utilizing the present technique, the resulting resonance Raman signal provides the clear, baseline Raman spectrum identifiable as sugar.

Figure 25:
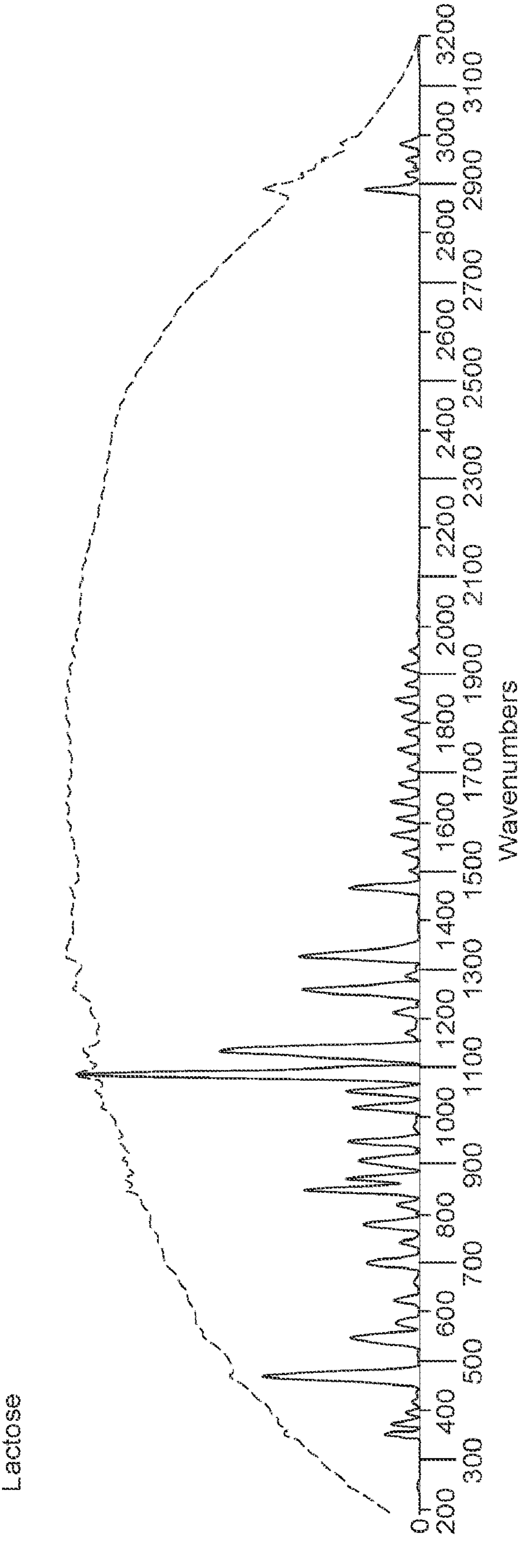

FIG. 25 shows a sampled resonance Raman signal (green) for lactose with fluorescence obscuring the underlying Raman spectrum (blue). After utilizing the present technique, the resulting resonance Raman signal provides the clear, baseline Raman spectrum identifiable as lactose.

This application is related to U.S. patent application Ser. No. 17/054,157 filed as a national stage application of PCT/US20/24788 both entitled "Multi-Dispersive Spectrometer." Both applications are incorporated by reference in their entirety for all they teach and suggest.

Chromatography

Figure 26:
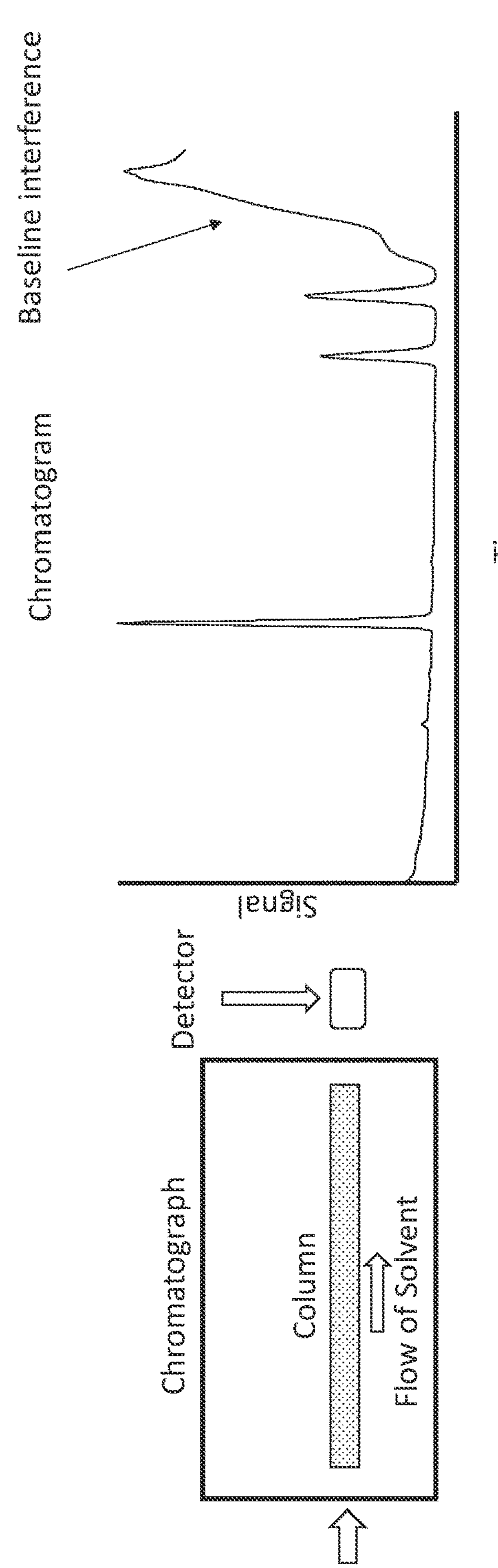
FIG. 26 illustrates an example of a chromatograph system and an example Chromatogram output signal (time versus signal) that may be obtained by taking a sample with the chromatograph system shown.

FIG. 26 shows an example of a chromatograph system and an example Chromatogram output signal (time versus signal) that may be obtained by taking a sample with the chromatograph system shown. In this embodiment, the chromatograph includes a column through which a solvent may be flowed through a sample within the column such as shown in the "flow of solvent" in FIG. 26. In this example, the detector obtains a time-varying signal that is shown to the right of the chromatograph schematic in FIG. 26. As can be seen in the time-varying sample, baseline interference can be seen along the right side of the graph showing the output signal. This baseline interference (similar to interference discussed above with respect to spectroscopy) can interfere with the operation of the chromatograph and cause a failure to identify a sample or a misidentification of the sample.

As discussed above, the optical data may include one or more component corresponding to an aberration introduced in the sampling or related to the optical system that is related to the baseline interference. If the component is a baseline component it is relatively stable in a range (e.g., a period of time in the example of FIG. 26), a method similar to that described above with respect to FIG. 7 above can be used to identify and separate the component corresponding to the aberration.

Figure 27:
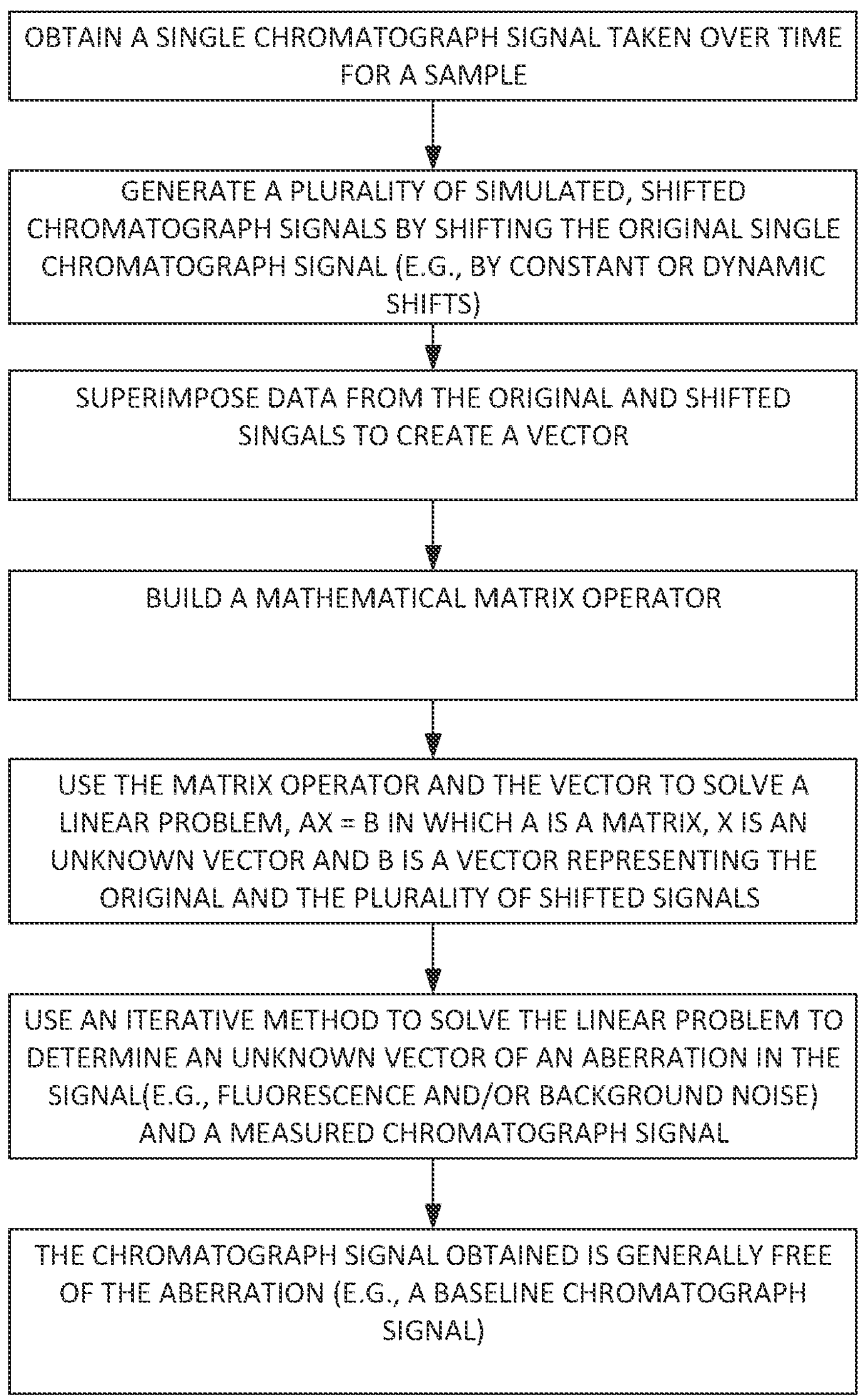
FIG. 27 illustrates a flowchart showing an example process of removing an aberration in a detected chromatograph signal (e.g., noise, fluorescence, or interference pattern from a chromatograph signal.

FIG. 27 is a flowchart showing an example process of removing an aberration in a detected chromatograph signal (e.g., noise, fluorescence, or interference pattern from a chromatograph signal. In this embodiment, a single chromatograph signal is determined by the chromatograph over a sampling period. A plurality of simulated, shifted chromatograph signals are obtained by shifting the original single measured chromatograph signal (e.g., by constant shifts or dynamic shifts) such as described above with respect to FIGS. 5 and 6. Any number of shifts may be generated.

Data from the original single chromatograph signal taken by the chromatograph and the plurality of simulated, shifted chromatograph signals are superimposed to create a vector representing the plurality of detected shifted spectroscopic signals. A mathematical matrix operator is also built. The matrix operator and the vector are used to solve a linear problem, Ax=B, where A is a matrix operator, x represents an unknown vector, and B represents the original single chromatograph signal and the plurality of simulated, shifted chromatograph signals. In one variation, an iterative method may be used to solve the linear problem that determines an unknown vector including the aberration (e.g., fluorescence, interference pattern and/or background noise) and a chromatograph signal. The matrix A represents identity matrices of non-shifted background spectrum from the plurality of shifted signal measurements. The chromatograph signal obtained is generally free of the aberration (fluorescence and/or background noise) free and is a baseline chromatograph signal (e.g., baseline chromatograph signal).

Figure 28:
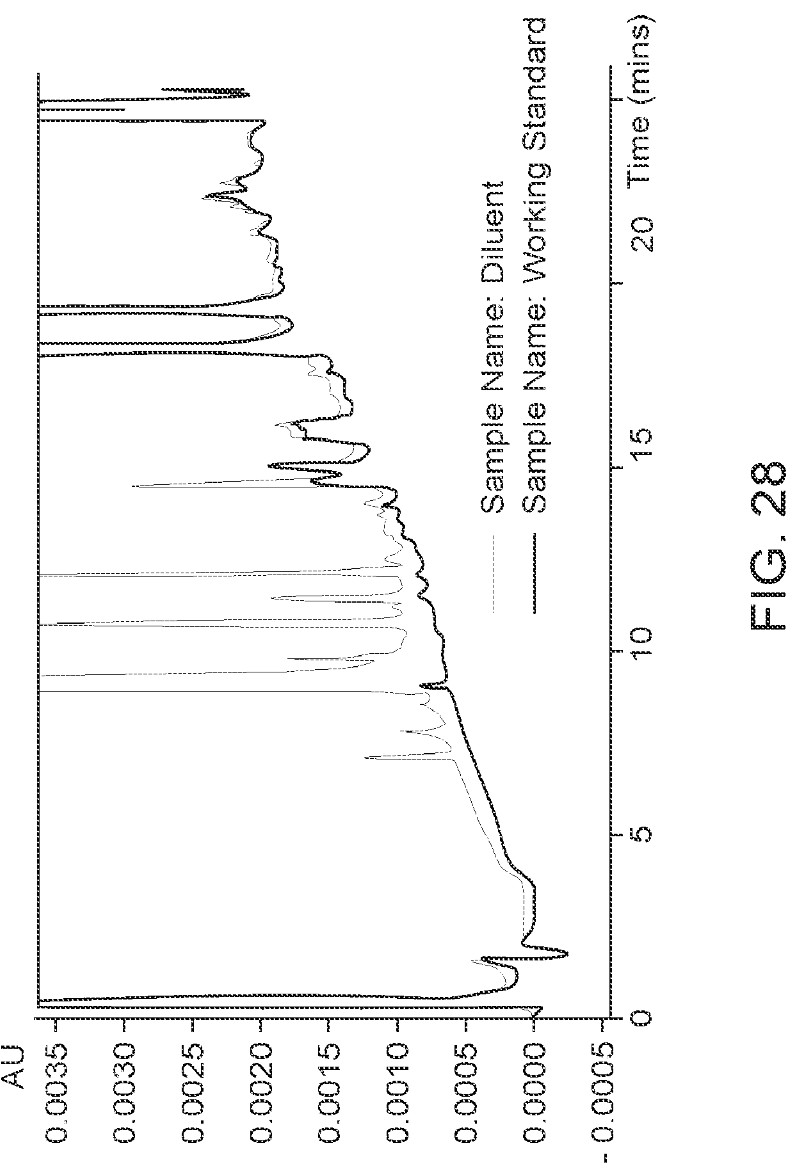
FIG. 28 illustrates another example of a chromatograph signal (signal versus time) in which one or more aberration leads to baseline interference such as shown.

FIG. 28 shows another example of a chromatograph signal (signal versus time) in which one or more aberration leads to baseline interference such as shown. The operations shown in FIG. 27 may similarly be used to isolate the interference from the chromatography signal as discussed above.

Absorption Spectroscopy

Figure 29:
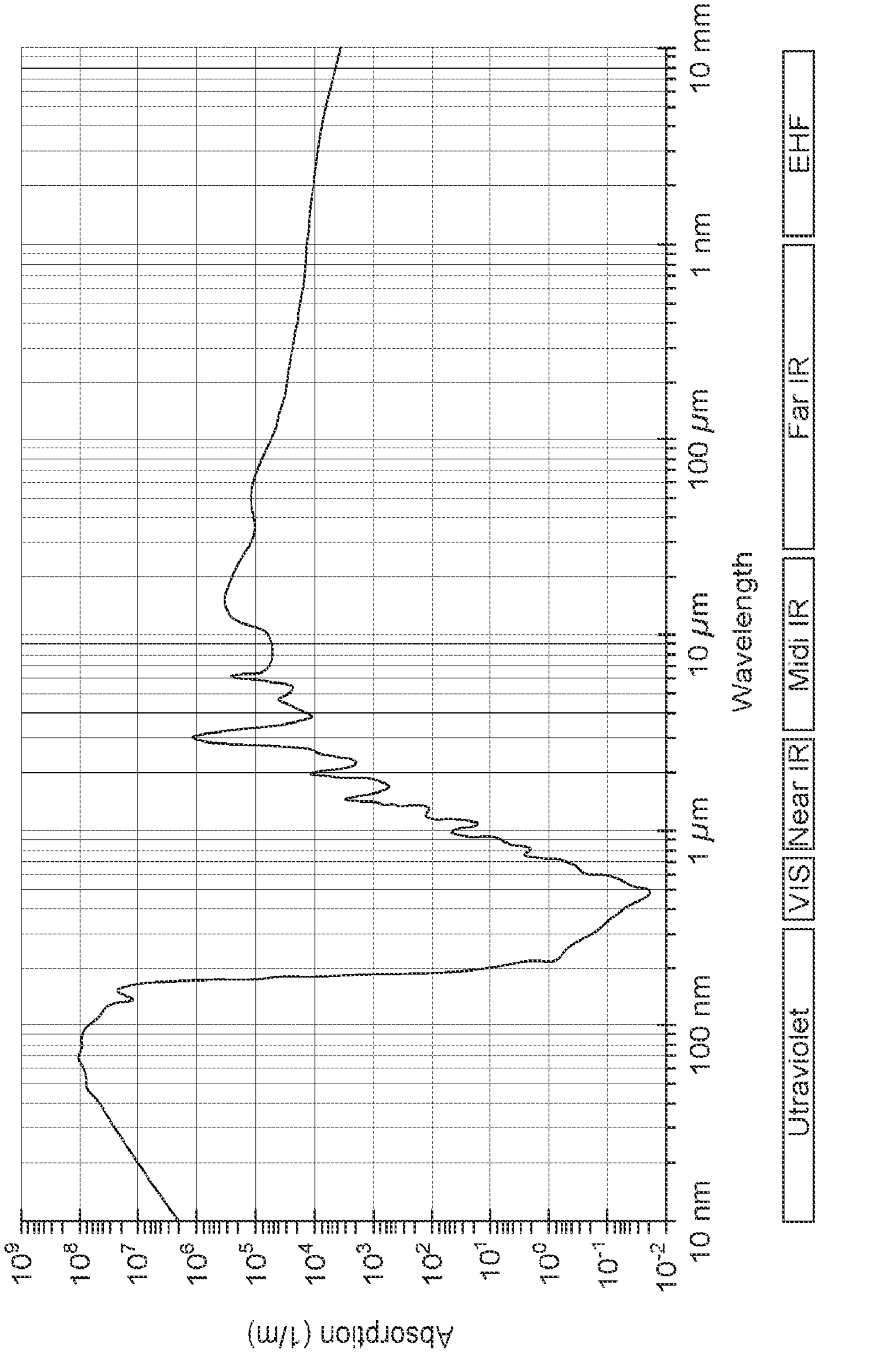
FIG. 29 illustrates a graph of an example absorption spectroscopy spectrum (absorption versus wavelength).

FIG. 29 shows a graph of an example absorption spectroscopy spectrum (absorption versus wavelength). Again, a baseline interference component or other aberration can be found in an absorption spectroscopic signal. The operations shown in FIG. 27 may similarly be used to isolate the interference from the absorption spectroscopic signal as discussed above.

X-Ray Fluorescence Spectroscopy

Figure 30:
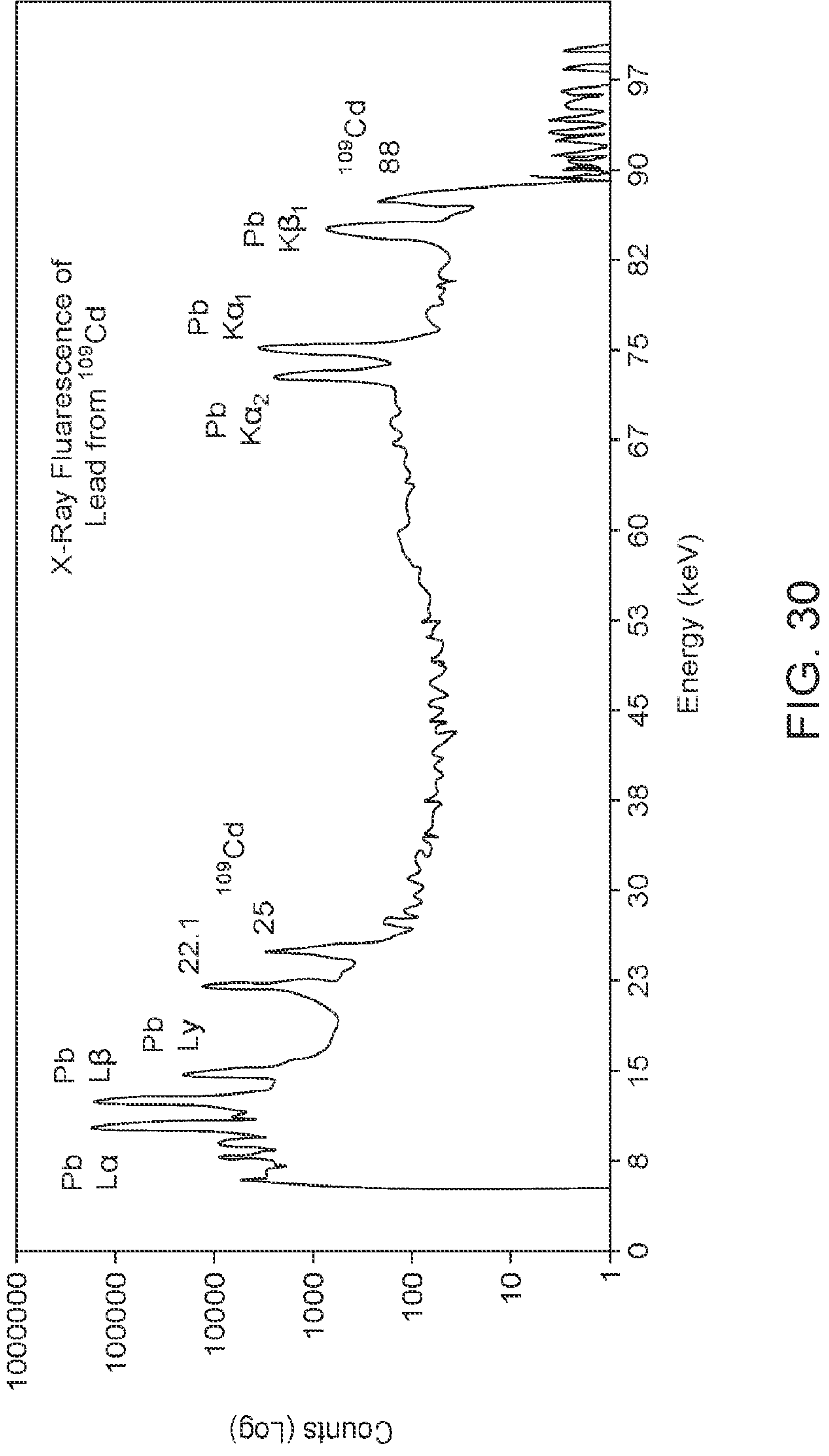
FIG. 30 illustrates a graph of an example X-Ray fluorescence spectroscopic signal (counts versus energy).

FIG. 30 shows a graph of an example X-Ray fluorescence spectroscopic signal (counts versus energy). Again, a baseline interference component or other aberration can be found in the X-Ray fluorescence spectroscopic signal. The operations shown in FIG. 27 may similarly be used to isolate the interference from the X-Ray fluorescence spectroscopic signal as discussed above.

Image Processing

Figure 31:
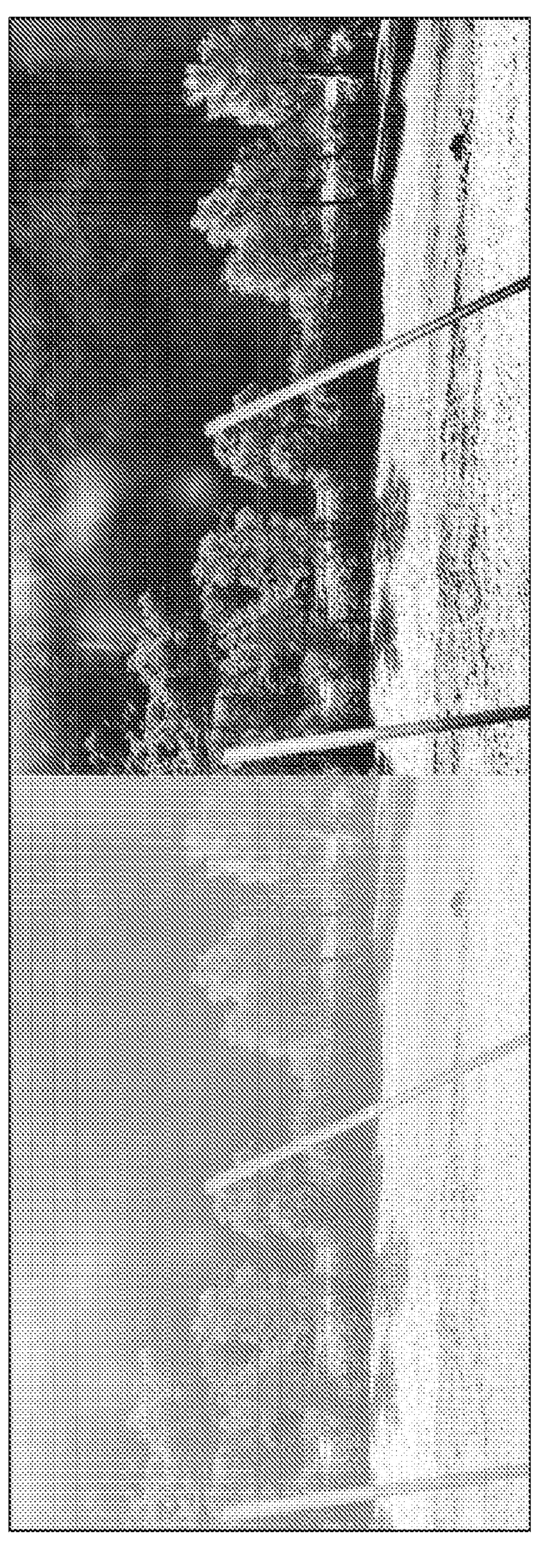
FIG. 31 illustrates an example of a photographic image (e.g., captured by a digital camera) on the left that includes background interference such as a caused by haze.

FIG. 31 shows an example of a photographic image (e.g., captured by a digital camera) on the left that includes background interference such as a caused by haze. FIG. 31 also shows an altered image with the haze removed (image on right). In this embodiment, the haze interference is relatively stable over regions of the x, y data corresponding to the image. Thus, by using the method of separating components of the image data, such as described in FIGS. 7 and 27, the haze-related component can be separated from the image data to produce the haze-free (or at least reduced haze) image shown in the right image of FIG. 31. Similarly, x, y, z data can also be used (e.g., a video camera recording varying over time) in a similar manner. Although haze is shown in this particular example, any background component (e.g., color modifications) can also be isolated and/or removed.

Infrared Spectroscopy

Figures 32A, 32B, 32C:
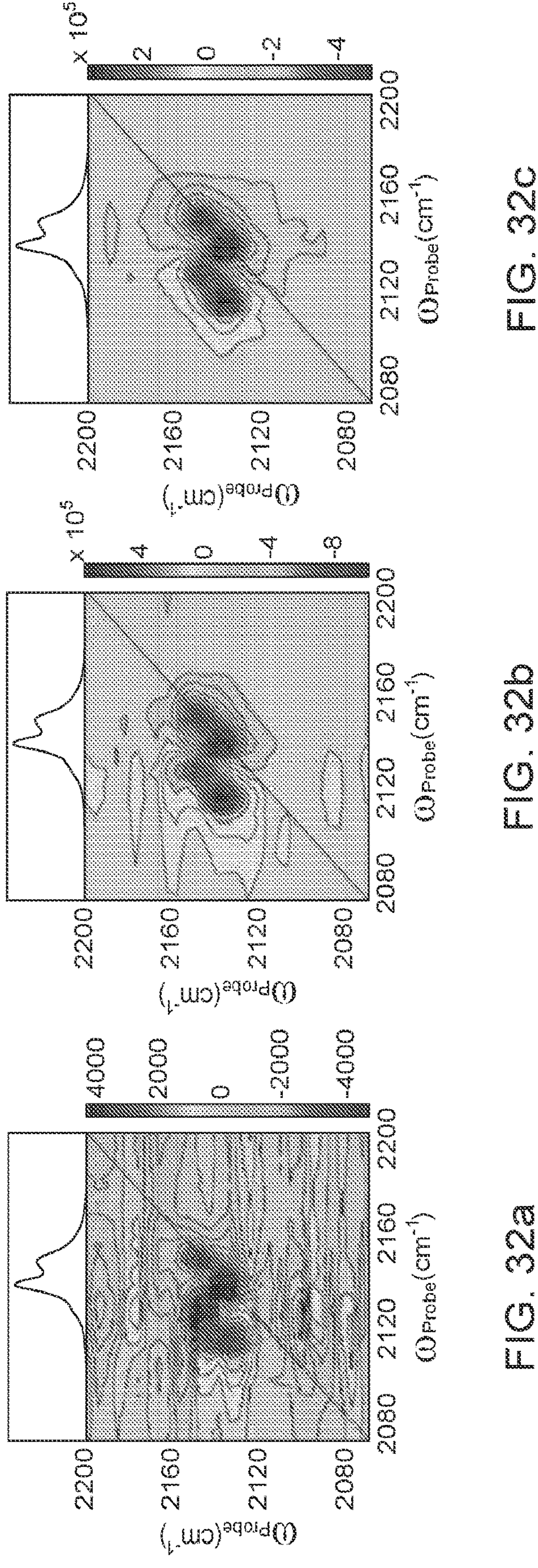
FIG. 32 illustrates an example infrared spectroscopic signal that can be adjusted as described herein. In this example, the output signal of the spectrometer comprises a 2-D spectrum in which baseline interference can also be present.

FIG. 32 shows an example infrared spectroscopic signal that can be adjusted as described herein. In this example, the output signal of the spectrometer comprises a 2-D spectrum in which baseline interference can also be present. In this yet example, an x, y signal that includes background can interfere with a detected spectroscopic signal. In the signal, x=wavenumbers, y=wavenumbers and z=absorbance. In the left image (a), for example, more background interference is present. A portion of the background is removed in the center image (b), and more interference is removed in the right image (c).

Figure 33:
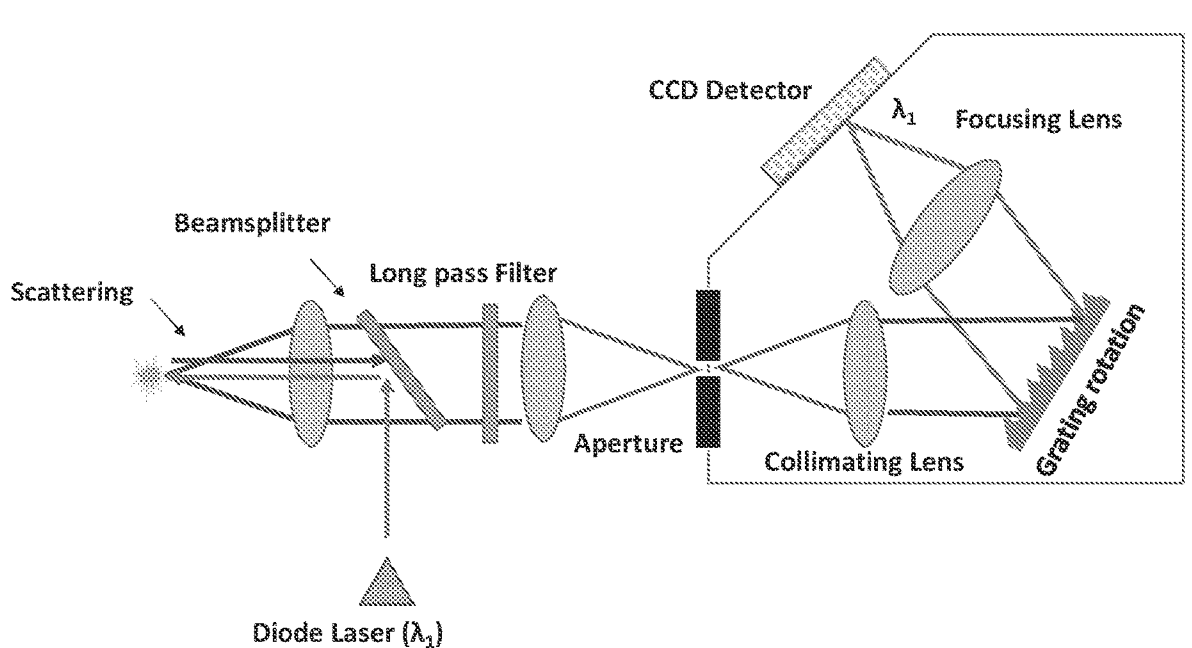
FIG. 33 illustrates shows an example embodiment of a spectrometer comprising a grating that is moveable relative to a detector of the spectrometer.

FIG. 33 shows an example embodiment of a spectrometer comprising a grating that is moveable relative to a detector of the spectrometer. Although FIG. 33 shows a grating that is moveable (e.g., a rotatable and/shiftable grating) and a stationary detector, a moveable detector or a combination of a moveable grating and a moveable detector may be employed.

FIG. 34 shows a moveable focusing lens disposed between the grating and the detector in an optical system of the spectrometer shown in FIG. 33. In this embodiment, the focusing lens can also be moved (e.g., translated).

Figure 35:
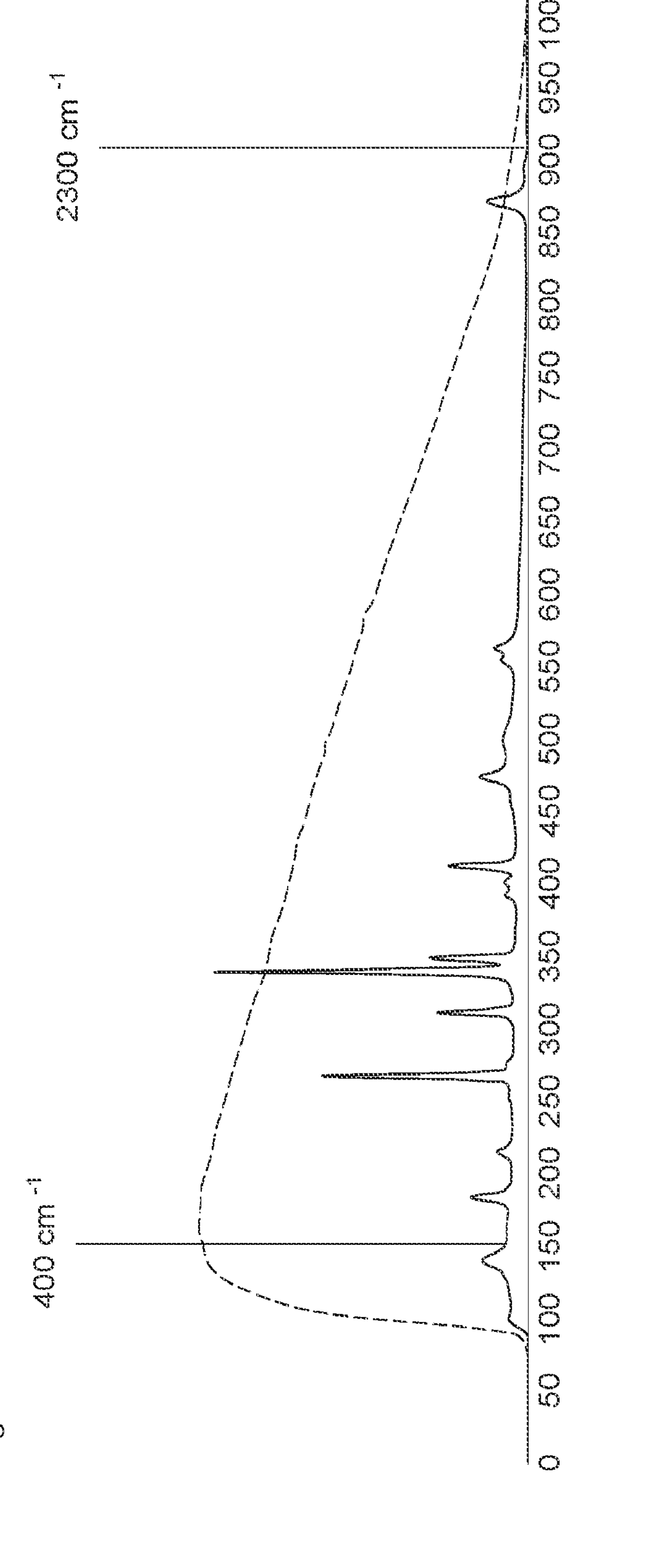
FIG. 35 illustrates an example signal for a spectrometer in which a collimating lens and focusing lens are aligned such that a desired or predetermined spectral range (e.g., 400-2300 $cm^{-1}$) is fit under a fluorescent curve.

In one embodiment, a method of aligning optical components within the spectrometer is provided. By aligning the optical components, effect(s) of vignetting or other optical aberrations may be reduced or eliminated. In this embodiment, spectra are captured and recorded for a first, fluorescent sample and a second, non-fluorescent sample. One or more optical components are moved iteratively in relatively small increments (e.g., of rotation and/or translation) until an alignment is detected. In one aspect, for example, the collimating lens and the focusing lens are aligned such that a desired or predetermined spectral range (e.g., 400-2300 $cm^{-1}$) is fit under a fluorescent curve, such as shown in FIG. 35. The alignment in this embodiment is such that the highest intensity point of the fluorescent curve is at the lowest desired/predetermined wavenumber. The intensity climb (low end) and drop off (high end) in the fluorescent sample is outside a desired/predetermined spectral range.

Although implementations have been described above with a certain degree of particularity, those skilled in the art could make numerous alterations to the disclosed embodiments without departing from the spirit or scope of this invention. All directional references (e.g., upper, lower, upward, downward, left, right, leftward, rightward, top, bottom, above, below, vertical, horizontal, clockwise, and counterclockwise) are only used for identification purposes to aid the reader's understanding of the present invention, and do not create limitations, particularly as to the position, orientation, or use of the invention. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A method of adjusting optical data comprising:

receiving a single set of optical data from a detector, wherein the single set of optical data comprises an optical signal and at least one baseline component in the optical data;

generating a plurality of simulated shifted optical data sets by mathematically shifting the single set of optical data, separating data corresponding to the optical signal and the at least one component, and determining the at least one component of the optical data based on the separated optical signal.

2. The method of claim 1, wherein the operation of separating data comprises separating the optical data corresponding to the optical signal from the optical data corresponding to at least one component by:

superimposing data from the single set of optical data obtained from the detector and the plurality of simulated shifted optical data sets to create a vector, and building a mathematical matrix operator, and solving to determine an optical signal and a vector corresponding to the at least one component.

3. The method of claim 1, wherein the optical data comprises one or more selected from the group comprising: x,y data, x,y,z data, spectroscopic data, chromatographic data, image data, and video image data.

4. The method of claim 1, wherein the baseline component comprises at least one of the group comprising an optical aberration, fluorescence, noise, and an interference pattern.

5. The method of claim 1, wherein the plurality of simulated shifted optical data sets comprises a plurality of relatively constant data shifts.

6. The method of claim 1, wherein the plurality of simulated shifted optical data sets comprises a plurality of constant data shifts.

7. The method of claim 1, wherein the plurality of simulated shifted optical data sets comprises at least two sets of dynamic data shifts.

8. An image processing device comprising:

an image detector; and a controller adapted to:

receive a single set of optical data from a detector, wherein the single set of optical data comprises an optical signal and at least one baseline component in the optical data, generate a plurality of simulated shifted optical data sets by mathematically shifting the single set of optical data, separate data corresponding to the optical signal and the at least one component, and determine the at least one baseline component of the single set of optical data based on the separated data.

9. The image processing device of claim 8, wherein the at least one baseline component comprises at least one of the group comprising an optical aberration, fluorescence, noise, and an interference pattern.

10. The image processing device of claim 8, wherein the plurality of simulated shifted optical data sets comprises a plurality of relatively constant data shifts.

11. The image processing device of claim 8, wherein the plurality of simulated shifted optical data sets comprises a plurality of constant data shifts.

12. The image processing device of claim 8, wherein the plurality of simulated shifted optical data sets comprises at least two sets of dynamic data shifts.

13. A spectrometer comprising:

a laser adapted to provide an excitation beam;

an optical system adapted to provide the excitation beam to a sample and receive a Raman scattering signal from the sample;

a detector adapted to receive the Raman scattering signal via the optical system; and a controller adapted to read a single set of sample spectral data from the detector, the single set of sample spectral data comprising a single measured Raman spectrum component based on the Raman scattering signal and a baseline component, generate a plurality of simulated sets of shifted spectral data by mathematically shifting the single set of sample spectral data corresponding to the single set of sample spectral data of the single measured Raman spectrum, separate data corresponding to the measured Raman spectrum and the baseline component from the single first set of sample spectral data, and determine at least one component of the sample based on the separated measured single Raman spectrum.

14. The spectrometer of claim 13, wherein the baseline component comprises at least one of noise, fluorescence, and an interference pattern.

15. The spectrometer of claim 13, wherein the baseline component is relatively stable compared to the Raman spectrum over a range of wavenumbers in the single set of sample spectral data.

16. The spectrometer of claim 13, wherein the Raman signal comprises a resonance Raman signal.

17. The spectrometer of claim 13, wherein the controller is adapted to separate the spectral data corresponding to the single Raman spectrum from the spectral data corresponding to the baseline component comprising at least one of noise, fluorescence, and an interference pattern by:

superimposing data from the spectral data obtained from the detector and the plurality of simulated sets of shifted spectral data to create a vector, and building a mathematical matrix operator, and solving to determine a Raman signal and a vector corresponding to at least one of noise, fluorescence, and an interference pattern.

18. The spectrometer of claim 13, wherein the spectral data comprises one or more of the group comprising: pixel data, wavenumber data, wavelength data, and energy data.

19. The spectrometer of claim 8, wherein the plurality of simulated shifted sets of shifted spectral data comprises a plurality of relatively constant data shifts.

20. The spectrometer of claim 13, wherein the plurality of simulated shifted sets of shifted spectral data comprises a plurality of constant data shifts.

21. The spectrometer of claim 13, wherein the plurality of simulated shifted sets of shifted spectral data comprises at least two sets of dynamic data shifts.

22. The spectrometer of claim 13, wherein the spectrometer comprises a portable, handheld spectrometer.

23. A method of determining a Raman spectroscopic signal, the method comprising:

obtaining a single measured spectrum;

generating a plurality of simulated shifted discrete spectra corresponding to the single measured spectrum;

superimposing data from each of the plurality of simulated shifted discrete spectra to create a vector;

building a mathematical matrix operator; and using the mathematical matrix operator to solve a linear problem.

24. The method of claim 23 wherein the method comprises using an iterative method to solve the linear problem that determines a Raman signal.

25. The method of claim 24 wherein the iterative method is further used to solve for an unknown vector of noise.

26. The method of claim 25 wherein the noise comprises at least one of fluorescence and background radiation.

27. The method of claim 23 wherein the mathematical matrix operator represents identity matrices of non-shifted noise spectral elements from the plurality of simulated shifted discrete spectra.

* * * * *